(12) United States Patent
Bito

(10) Patent No.: US 9,904,042 B2
(45) Date of Patent: Feb. 27, 2018

(54) ZOOM LENS SYSTEM, IMAGING DEVICE AND CAMERA

(71) Applicant: Panasonic Intellectual Property Management Co., Ltd., Osaka (JP)

(72) Inventor: Takakazu Bito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 11 days.

(21) Appl. No.: 14/986,864

(22) Filed: Jan. 4, 2016

(65) Prior Publication Data

US 2016/0116722 A1 Apr. 28, 2016

Related U.S. Application Data

(63) Continuation of application No. PCT/JP2013/005792, filed on Sep. 27, 2013.

(30) Foreign Application Priority Data

Jul. 12, 2013 (JP) .................................. 2013-146134

(51) Int. Cl.
*G02B 15/14* (2006.01)
*G02B 15/173* (2006.01)
(Continued)

(52) U.S. Cl.
CPC ......... *G02B 15/173* (2013.01); *G02B 13/009* (2013.01); *G02B 15/20* (2013.01);
(Continued)

(58) Field of Classification Search
CPC ........ G02B 15/00; G02B 15/14; G02B 15/15; G02B 15/16; G02B 15/173; G02B 15/22; G02B 27/64; G02B 27/646
See application file for complete search history.

(56) References Cited

U.S. PATENT DOCUMENTS

| 5,189,557 A * | 2/1993 | Endo .................... G02B 15/173 359/683 |
| 2005/0190447 A1 * | 9/2005 | Misaka ................ G02B 27/646 359/557 |

(Continued)

FOREIGN PATENT DOCUMENTS

| JP | 10-333038 | 12/1998 |
| JP | 2011-186417 | 9/2011 |

(Continued)

OTHER PUBLICATIONS

International Search Report dated Dec. 24, 2013 in International (PCT) Application No. PCT/JP2013/005792.
Office Action dated Aug. 29, 2017 in U.S. Appl. No. 15/053,371.

*Primary Examiner* — Thong Nguyen
(74) *Attorney, Agent, or Firm* — Wenderoth, Lind & Ponack, L.L.P.

(57) ABSTRACT

A zoom lens system includes a first lens unit, a second lens unit, a third lens unit, a fourth lens unit, a fifth lens unit, and a sixth lens unit. In zooming, at least the first lens unit, the second lens unit, and the third lens unit move along an optical axis so that an interval between the first lens unit and the second lens unit at a telephoto limit becomes larger than that at a wide-angle limit, and an interval between the second lens unit and the third lens unit at the telephoto limit becomes narrower than that at the wide-angle limit. An aperture diaphragm is disposed between the second lens unit and the third lens unit. A condition of $18.5 < f_{G1}/f_W < 30.0$ ($f_{G1}$: a focal length of the first lens unit, $f_W$: a focal length of the entire system at the wide-angle limit) is satisfied.

8 Claims, 16 Drawing Sheets

(51) Int. Cl.
*G02B 13/00* (2006.01)
*G02B 15/20* (2006.01)
*G02B 27/00* (2006.01)
*H04N 5/225* (2006.01)
*H04N 5/232* (2006.01)
*H04N 5/262* (2006.01)
*G02B 13/18* (2006.01)
*G02B 27/42* (2006.01)

(52) U.S. Cl.
CPC ....... *G02B 27/0025* (2013.01); *H04N 5/2254* (2013.01); *H04N 5/23296* (2013.01); *H04N 5/2628* (2013.01); *G02B 13/18* (2013.01); *G02B 27/4211* (2013.01)

(56) References Cited

U.S. PATENT DOCUMENTS

| | | |
|---|---|---|
| 2008/0259464 A1 | 10/2008 | Kuroda et al. |
| 2009/0040604 A1 | 2/2009 | Obu et al. |
| 2009/0116120 A1 | 5/2009 | Saruwatari |
| 2010/0195215 A1* | 8/2010 | Saori .................. G02B 15/173 359/683 |
| 2011/0019033 A1 | 1/2011 | Ori et al. |
| 2011/0141577 A1 | 6/2011 | Kimura |
| 2012/0087017 A1 | 4/2012 | Fujisaki |
| 2012/0300096 A1 | 11/2012 | Miki et al. |
| 2013/0162884 A1 | 6/2013 | Tashiro et al. |
| 2013/0208364 A1 | 8/2013 | Ito |
| 2013/0242169 A1 | 9/2013 | Okubo |
| 2013/0321681 A1 | 12/2013 | Sakai |
| 2014/0043692 A1 | 2/2014 | Mogi |
| 2014/0176778 A1* | 6/2014 | Kim .................... G02B 15/173 348/335 |
| 2014/0204470 A1* | 7/2014 | Chen ................... G02B 15/173 359/687 |
| 2014/0218800 A1* | 8/2014 | Li ....................... G02B 27/646 359/557 |
| 2014/0313397 A1* | 10/2014 | Yanagisawa ......... G02B 15/173 348/345 |
| 2014/0347522 A1* | 11/2014 | Iwasawa ............ H04N 5/23296 348/240.3 |
| 2014/0368699 A1 | 12/2014 | Morooka et al. |

FOREIGN PATENT DOCUMENTS

| | | |
|---|---|---|
| JP | 4891439 | 3/2012 |
| JP | 4891440 | 3/2012 |
| JP | 4891441 | 3/2012 |
| JP | 2012-83472 | 4/2012 |
| JP | 2013-029851 | 2/2013 |
| JP | 2013-164455 | 8/2013 |
| JP | 2013-178298 | 9/2013 |
| JP | 2013-190741 | 9/2013 |
| JP | 2013-235060 | 11/2013 |
| JP | 2013-250340 | 12/2013 |
| JP | 2014-35418 | 2/2014 |
| WO | 2006/095544 | 9/2006 |

* cited by examiner

ZOOM LENS SYSTEM, IMAGING DEVICE AND CAMERA

RELATED APPLICATIONS

This application is a Continuation of International Application No. PCT/JP2013/005792, filed on Sep. 27, 2013, which in turn claims the benefit of Japanese Application No. 2013-146134, filed on Jul. 12, 2013, the disclosures of which Applications are incorporated by reference herein.

BACKGROUND

Field

The present disclosure relates to zoom lens systems, imaging devices, and cameras.

Description of the Related Art

Size reduction and performance improvement are strongly required of cameras having image sensors performing photoelectric conversion, such as digital still cameras, digital video cameras, and the like (simply referred to as digital cameras, hereinafter).

Japanese Laid-Open Patent Publication No. 10-333038 discloses a zoom lens system having a six-unit configuration of positive, negative, positive, positive, negative, and positive, and performing zooming by changing the interval between the respective lens units.

Japanese Patent No. 4891439, Japanese Patent No. 4891440, and Japanese Patent No. 4891441 discloses a zoom lens system having a two-unit configuration of positive and negative, in which, in zooming, the first lens unit moves with reciprocated locus being convex to the image side.

SUMMARY

The present disclosure provides a compact zoom lens system having excellent optical performance over the entire zoom range while having a high magnification ratio. Further the present disclosure provides an imaging device including the zoom lens system, and a thin and compact camera including the imaging device.

A zoom lens system according to the present disclosure, in order from an object side to an image side, includes:
a first lens unit having positive optical power;
a second lens unit having negative optical power;
a third lens unit having positive optical power;
a fourth lens unit having optical power;
a fifth lens unit having optical power, and
a sixth lens unit having optical power, wherein
in zooming from a wide-angle limit to a telephoto limit at the time of image taking, at least the first lens unit, the second lens unit, and the third lens unit move along an optical axis so that an interval between the first lens unit and the second lens unit at the telephoto limit becomes larger than that at the wide-angle limit, and an interval between the second lens unit and the third lens unit at the telephoto limit becomes narrower than that at the wide-angle limit,
an aperture diaphragm is disposed between the second lens unit and the third lens unit, and
the following condition (1) is satisfied:

$$18.5 < f_{G1}/f_W < 30.0 \tag{1}$$

where
$f_{G1}$ is a focal length of the first lens unit, and
$f_W$ is a focal length of the entire system at the wide-angle limit An imaging device according to the present disclosure is an imaging device capable of outputting an optical image of an object as an electric image signal, and including:
a zoom lens system that forms an optical image of the object; and
an image sensor that converts the optical image formed by the zoom lens system into the electric image signal, wherein
the zoom lens system is a zoom lens system, in order from an object side to an image side, including:
a first lens unit having positive optical power;
a second lens unit having negative optical power;
a third lens unit having positive optical power;
a fourth lens unit having optical power;
a fifth lens unit having optical power, and
a sixth lens unit having optical power, wherein
in zooming from a wide-angle limit to a telephoto limit at the time of image taking, at least the first lens unit, the second lens unit, and the third lens unit move along an optical axis so that an interval between the first lens unit and the second lens unit at the telephoto limit becomes larger than that at the wide-angle limit, and an interval between the second lens unit and the third lens unit at the telephoto limit becomes narrower than that at the wide-angle limit,
an aperture diaphragm is disposed between the second lens unit and the third lens unit, and
the following condition (1) is satisfied:

$$18.5 < f_{G1}/f_W < 30.0 \tag{1}$$

where
$f_{G1}$ is a focal length of the first lens unit, and
$f_W$ is a focal length of the entire system at the wide-angle limit.

A camera according to the present disclosure is a camera for converting an optical image of an object into an electric image signal and then performing at least one of displaying and storing of the converted image signal, and including:
an imaging device including a zoom lens system that forms the optical image of the object, and an image sensor that converts the optical image formed by the zoom lens system into the electric image signal, wherein
the zoom lens system is a zoom lens system including:
a first lens unit having positive optical power;
a second lens unit having negative optical power;
a third lens unit having positive optical power;
a fourth lens unit having optical power;
a fifth lens unit having optical power, and
a sixth lens unit having optical power, wherein
in zooming from a wide-angle limit to a telephoto limit at the time of image taking, at least the first lens unit, the second lens unit, and the third lens unit move along an optical axis so that an interval between the first lens unit and the second lens unit at the telephoto limit becomes larger than that at the wide-angle limit, and an interval between the second lens unit and the third lens unit at the telephoto limit becomes narrower than that at the wide-angle limit,
an aperture diaphragm is disposed between the second lens unit and the third lens unit, and
the following condition (1) is satisfied:

$$18.5 < f_{G1}/f_W < 30.0 \tag{1}$$

where
$f_{G1}$ is a focal length of the first lens unit, and
$f_W$ is a focal length of the entire system at the wide-angle limit.

The zoom lens system according to the present disclosure is compact and has excellent optical performance over the entire zoom range while having a high magnification ratio.

DETAILED DESCRIPTION

Figure 1:
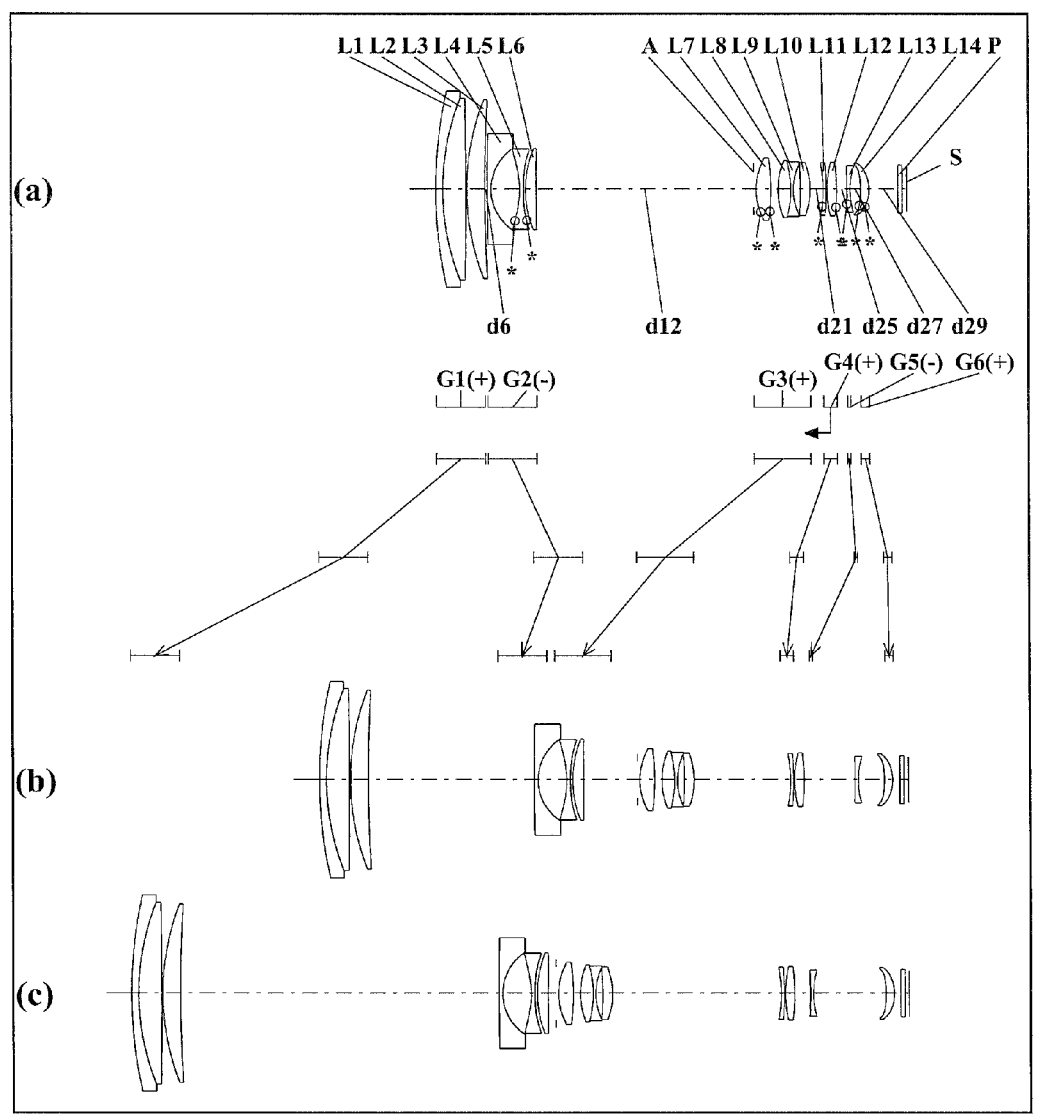
FIG. 1 is a lens arrangement diagram showing an infinity in-focus condition of a zoom lens system according to Embodiment 1 (Numerical Example 1)
Figure 2:
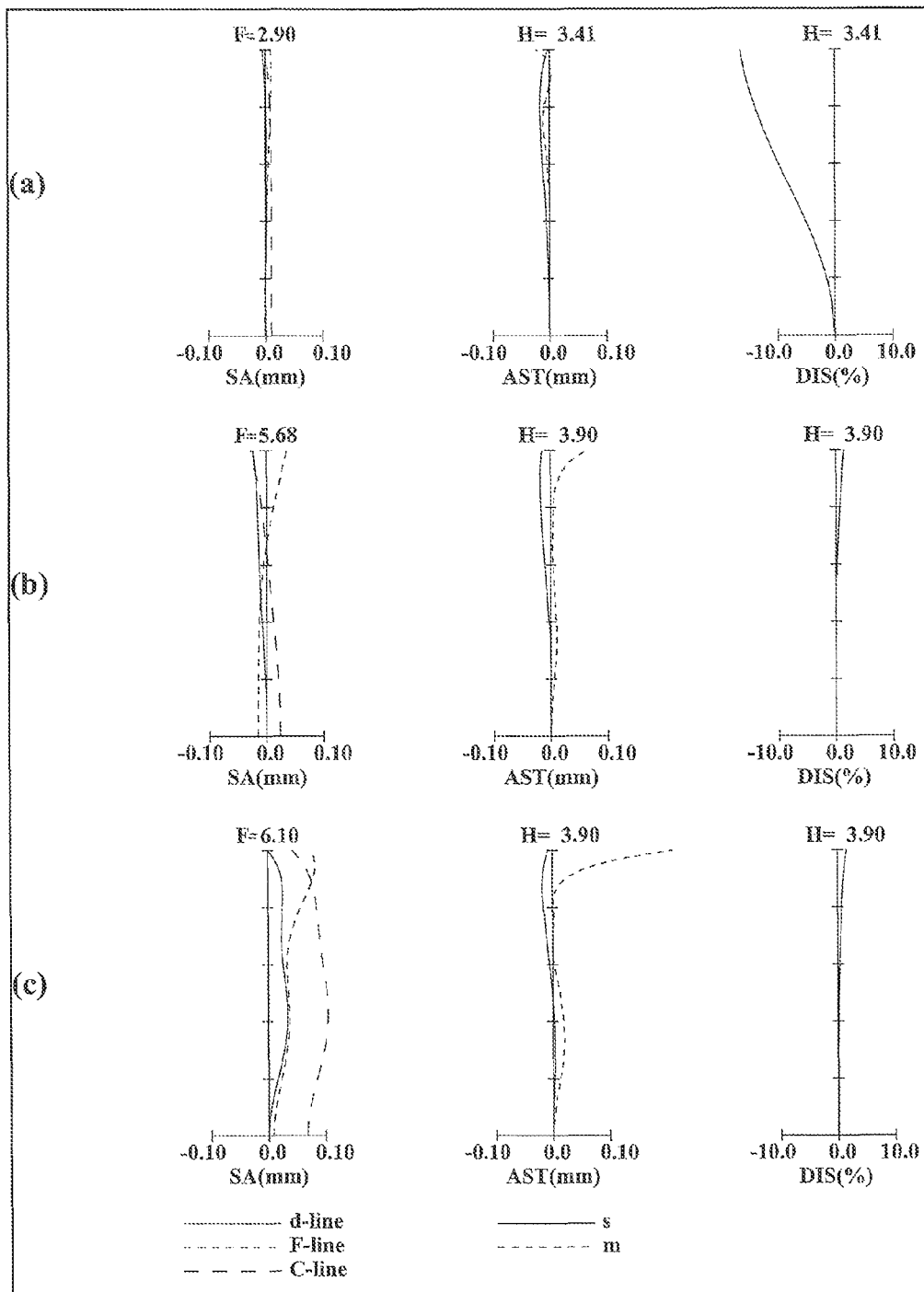
FIG. 2 is a longitudinal aberration diagram of an infinity in-focus condition of the zoom lens system according to Numerical Example 1.
Figure 3:
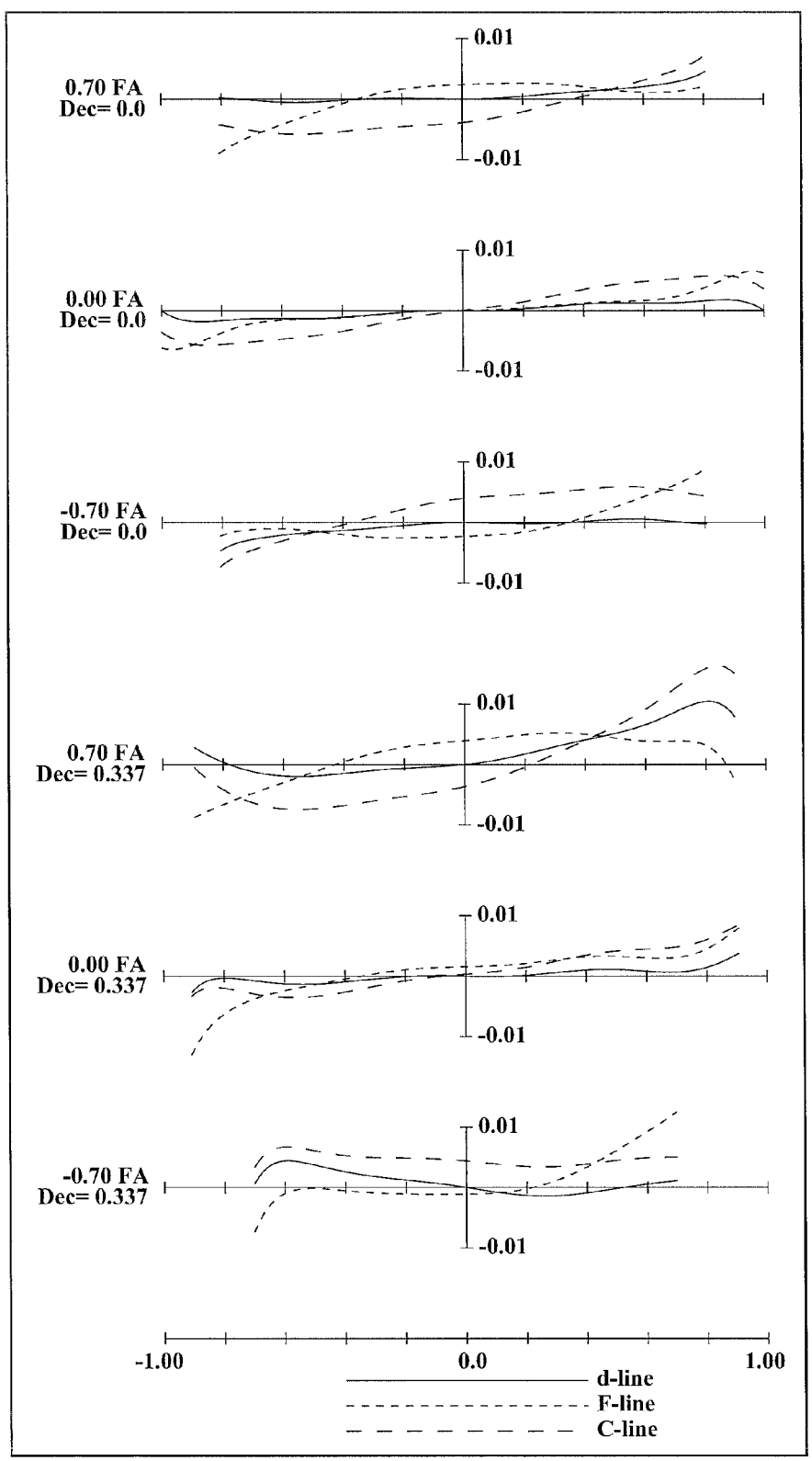
FIG. 3 is a lateral aberration diagram in a basic state where image blur compensation is not performed and in an image blur compensation state at a telephoto limit of the zoom lens system according to Numerical Example 1.

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

(Embodiments 1 to 5)

FIGS. 1, 4, 7, 10 and 13 are lens arrangement diagrams of zoom lens systems according to Embodiments 1 to 5, respectively. Each zoom lens system is in an infinity in-focus condition.

In each Figure, part (a) shows a lens configuration at a wide-angle limit (in the minimum focal length condition: focal length $f_W$), part (b) shows a lens configuration at a middle position (in an intermediate focal length condition: focal length $f_M = (f_W * f_T)^{1/2}$), and part (c) shows a lens configuration at a telephoto limit (in the maximum focal length condition: focal length $f_T$). Further, in each Figure, each bent arrow located between part (a) and part (b) indicates a line obtained by connecting the positions of each lens unit respectively at a wide-angle limit, a middle position and a telephoto limit, in order from the top. In the part between the wide-angle limit and the middle position and the part between the middle position and the telephoto limit, the positions are connected simply with a straight line, and hence this line does not indicate actual motion of each lens unit.

In each Figure, an arrow imparted to a lens unit indicates focusing from an infinity in-focus condition to a close-object in-focus condition. That is, in FIGS. 1, 4, 7, 10 and 13, the arrow indicates a direction along which a fourth lens unit G4 described later moves in focusing from the infinity in-focus condition to the close-object in-focus condition. In FIGS. 1, 4, 7, 10 and 13, since the symbols of the respective lens units are imparted to part (a), the arrow indicating focusing is placed beneath each symbol of each lens unit for the convenience sake. However, the direction along which each lens unit moves in focusing in each zooming condition will be hereinafter described in detail for each embodiment.

In FIGS. 1, 4, 7, 10 and 13, an asterisk "*" imparted to a particular surface indicates that the surface is aspheric. In each Figure, symbol (+) or (−) imparted to the symbol of each lens unit corresponds to the sign of the optical power of the lens unit. In each Figure, a straight line located on the most right-hand side indicates the position of the image surface S. On the object side relative to the image surface S (between the image surface S and the most image side lens surface of a sixth lens unit G6 in Embodiments 1 to 3, and between the image surface S and the most image side lens surface of a fifth lens unit G5 in Embodiments 4 and 5), a parallel plate P equivalent to an optical low-pass filter or a face plate of an image sensor is provided.

Further, as shown in FIGS. 1, 4, 7, 10 and 13, an aperture diaphragm A is provided between a second lens unit G2 and a third lens unit G3. The aperture diaphragm A moves along the optical axis together with the third lens unit G3 in zooming from the wide-angle limit to the telephoto limit at the time of image taking.

[1. Embodiment 1(FIG. 1)]

As shown in FIG. 1, the zoom lens system according to Embodiment 1, in order from the object side to the image side, comprises a first lens unit G1 having positive optical power, a second lens unit G2 having negative optical power, a third lens unit G3 having positive optical power, a fourth lens unit G4 having positive optical power, a fifth lens unit G5 having negative optical power, and a sixth lens unit G6 having positive optical power. In the zoom lens system according to Embodiment 1, since the respective lens units are arranged in the above optical power allocation, size reduction of the entire lens system is achieved while maintaining excellent optical performance.

The first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other. In the surface data of the corresponding Numerical Example described later, a surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side. The fifth lens element L5 has two aspheric surfaces.

The third lens unit G3, in order from the object side to the image side, comprises: a bi-convex seventh lens element L7; a bi-convex eighth lens element L8; a bi-concave ninth lens element L9; and a positive meniscus tenth lens element L10 with the convex surface facing the image side. Among these, the eighth lens element L8 and the ninth lens element L9 are cemented with each other. In the surface data of the corresponding Numerical Example described later, a surface number 17 is imparted to an adhesive layer between the eighth lens element L8 and the ninth lens element L9. The seventh lens element L7 has two aspheric surfaces.

The fourth lens unit G4, in order from the object side to the image side, comprises: a negative meniscus eleventh lens element L11 with the convex surface facing the image side; and a bi-convex twelfth lens element L12. The eleventh lens element L11 has an aspheric object-side surface. The twelfth lens element L12 has an aspheric image-side surface.

The fifth lens unit G5 comprises solely a bi-concave thirteenth lens element L13. The thirteenth lens element L13 has an aspheric object-side surface.

The sixth lens unit G6 comprises solely a positive meniscus fourteenth lens element L14 with the convex surface facing the image side. The fourteenth lens element L14 has two aspheric surfaces.

An aperture diaphragm A is disposed between the second lens unit G2 and the third lens unit G3.

In the zoom lens system according to Embodiment 1, the entirety of the third lens unit G3 corresponds to an image blur compensation lens unit described later which moves in a direction perpendicular to the optical axis to optically compensate for image blur.

In the zoom lens system according to Embodiment 1, in zooming from the wide-angle limit to the telephoto limit at the time of image taking, the first lens unit G1, the fourth lens unit G4, and the fifth lens unit G5 move to the object side, the second lens unit G2 moves with locus of a convex to the image side, the third lens unit G3 monotonically moves to the object side, and the sixth lens unit G6 moves to the image side. That is, in zooming, the first lens unit G1, the second lens unit G2, the third lens unit G3, the fourth lens unit G4, the fifth lens unit G5, and the sixth lens unit G6 individually move along the optical axis so that the interval between the first lens unit G1 and the second lens unit G2, the interval between the third lens unit G3 and the fourth lens unit G4, and the interval between the fifth lens unit G5 and the sixth lens unit G6 increase, and the interval between the second lens unit G2 and the third lens unit G3 and the interval between the fourth lens unit G4 and the fifth lens unit G5 decrease.

In the zoom lens system according to Embodiment 1, in focusing from the infinity in-focus condition to the close-object in-focus condition, the fourth lens unit G4 as a focusing lens unit moves to the object side along the optical axis in any zooming condition.

The focusing lens unit may be the fifth lens unit G5 or the sixth lens unit G6.

[2. Embodiment 2(FIG. 4)]

Figure 4:
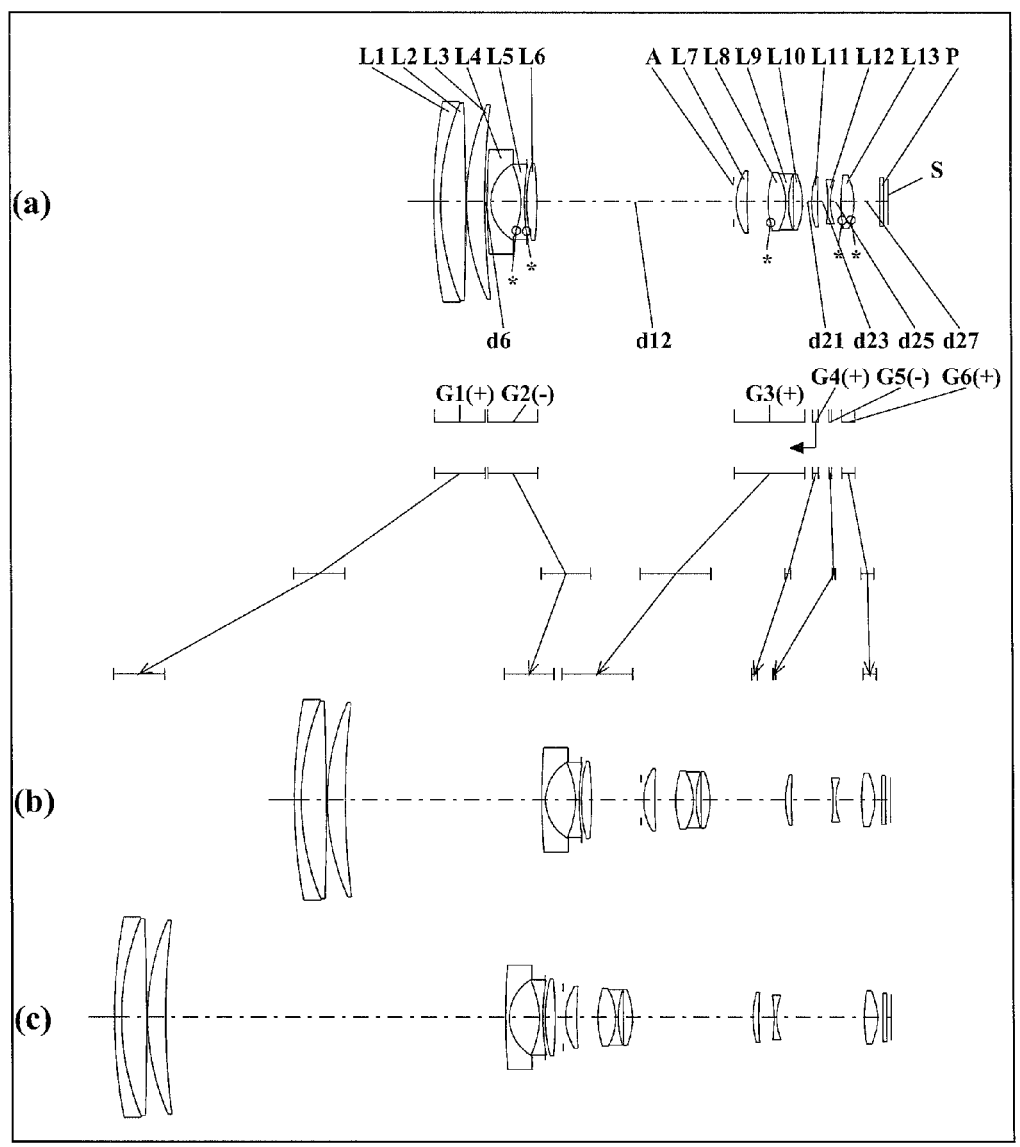
FIG. 4 is a lens arrangement diagram showing an infinity in-focus condition of a zoom lens system according to Embodiment 2 (Numerical Example 2)
Figure 5:
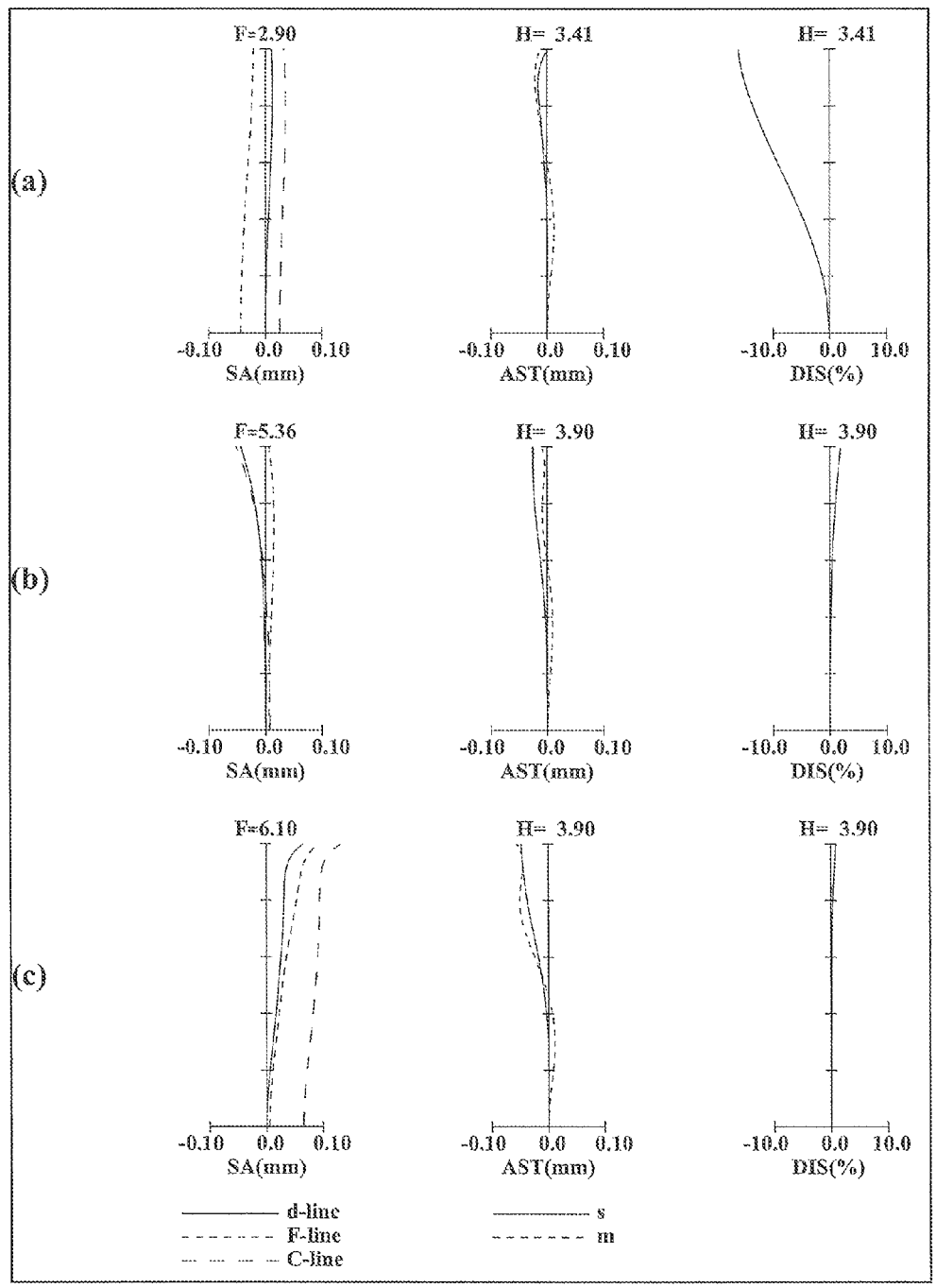
FIG. 5 is a longitudinal aberration diagram showing an infinity in-focus condition of the zoom lens system according to Numerical Example 2.
Figure 6:
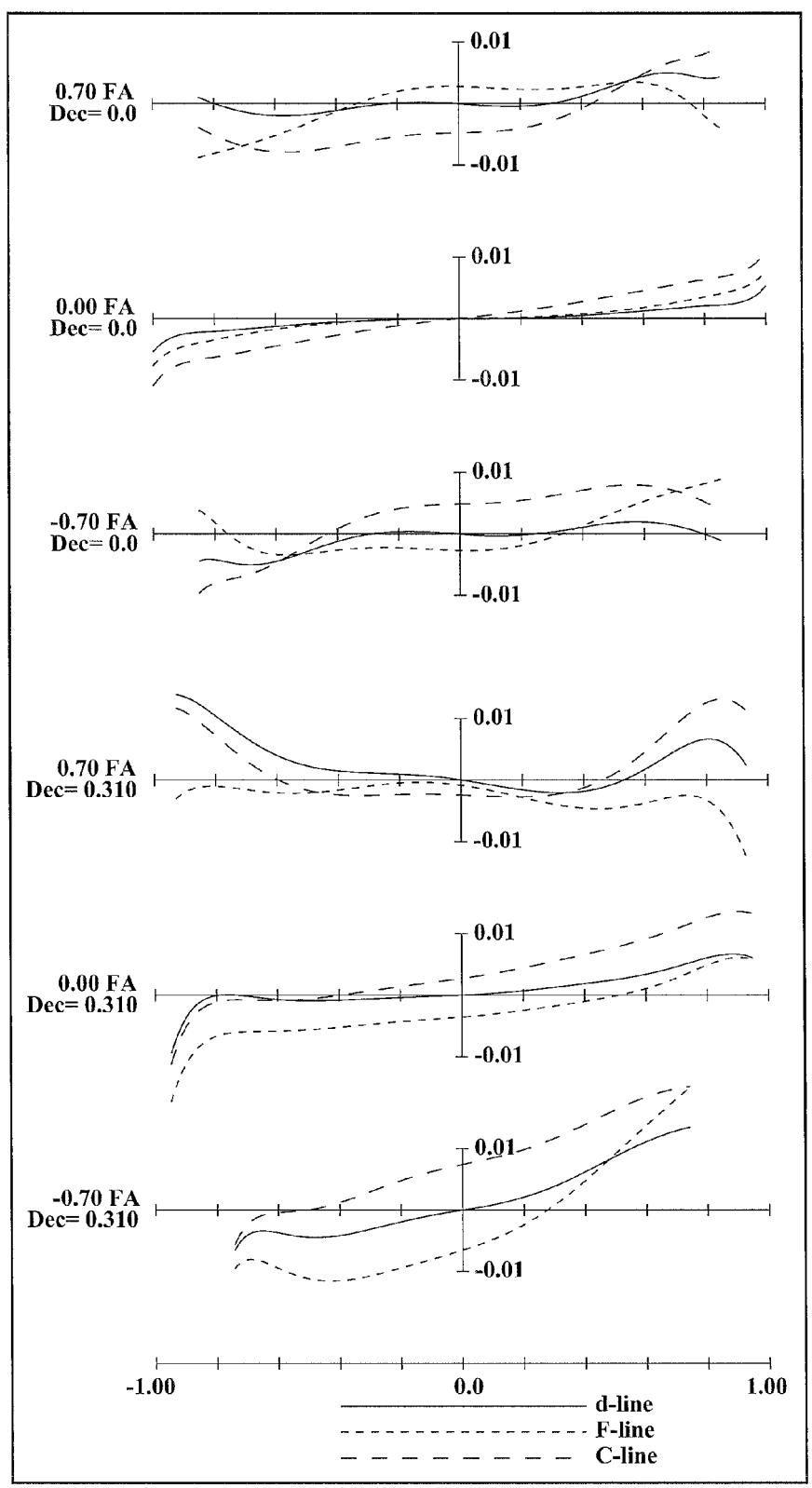
FIG. 6 is a lateral aberration diagram in a basic state where image blur compensation is not performed and in an image blur compensation state at a telephoto limit of the zoom lens system according to Numerical Example 2.

As shown in FIG. 4, the zoom lens system according to Embodiment 2, in order from the object side to the image side, comprises a first lens unit G1 having positive optical power, a second lens unit G2 having negative optical power, a third lens unit G3 having positive optical power, a fourth lens unit G4 having positive optical power, a fifth lens unit G5 having negative optical power, and a sixth lens unit G6 having positive optical power. In the zoom lens system according to Embodiment 2, since the respective lens units are arranged in the above optical power allocation, size reduction of the entire lens system is achieved While maintaining excellent optical performance.

The first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other. In the surface data of the corresponding Numerical Example described later, a surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a bi-concave fifth lens element L5; and a bi-convex sixth lens element L6. The fifth lens element L5 has two aspheric surfaces.

The third lens unit G3, in order from the object side to the image side, comprises: a positive meniscus seventh lens element L7 with the convex surface facing the object side; a bi-convex eighth lens element L8; a bi-concave ninth lens element L9; and a bi-convex tenth lens element L10. Among these, the eighth lens element L8 and the ninth lens element L9 are cemented with each other. In the surface data of the corresponding Numerical Example described later, a surface number 17 is imparted to an adhesive layer between the eighth lens element L8 and the ninth lens element L9. The eighth lens element L8 has an aspheric object-side surface.

The fourth lens unit G4 comprises solely a positive meniscus eleventh lens element L11 with the convex surface facing the object side.

The fifth lens unit G5 comprises solely a bi-concave twelfth lens element L12.

The sixth lens unit G6 comprises solely a bi-convex thirteenth lens element L13. The thirteenth lens element L13 has two aspheric surfaces.

An aperture diaphragm A is disposed between the second lens unit G2 and the third lens unit G3.

In the zoom lens system according to Embodiment 2, the entirety of the third lens unit G3 corresponds to an image blur compensation lens unit described later which moves in a direction perpendicular to the optical axis to optically compensate for image blur.

In the zoom lens system according to Embodiment 2, in zooming from the wide-angle limit to the telephoto limit at the time of image taking, the first lens unit G1, the fourth lens unit G4, and the fifth lens unit G5 move to the object side, the second lens unit G2 moves with locus of a convex to the image side, the third lens unit G3 monotonically moves to the object side, and the sixth lens unit G6 moves to the image side. That is, in zooming, the first lens unit G1, the second lens unit G2, the third lens unit G3, the fourth lens unit G4, the fifth lens unit G5, and the sixth lens unit G6 individually move along the optical axis so that the interval between the first lens unit G1 and the second lens unit G2, the interval between the third lens unit G3 and the fourth lens unit G4, the interval between the fourth lens unit G4 and the fifth lens unit G5, and the interval between the fifth lens unit G5 and the sixth lens unit G6 increase, and the interval between the second lens unit G2 and the third lens unit G3 decreases.

In the zoom lens system according to Embodiment 2, in focusing from the infinity in-focus condition to the close-object in-focus condition, the fourth lens unit G4 as a focusing lens unit moves to the object side along the optical axis in any zooming condition.

The focusing lens unit may be the fifth lens unit G5 or the sixth lens unit G6.

[3. Embodiment 3(FIG. 7)]

Figure 7:
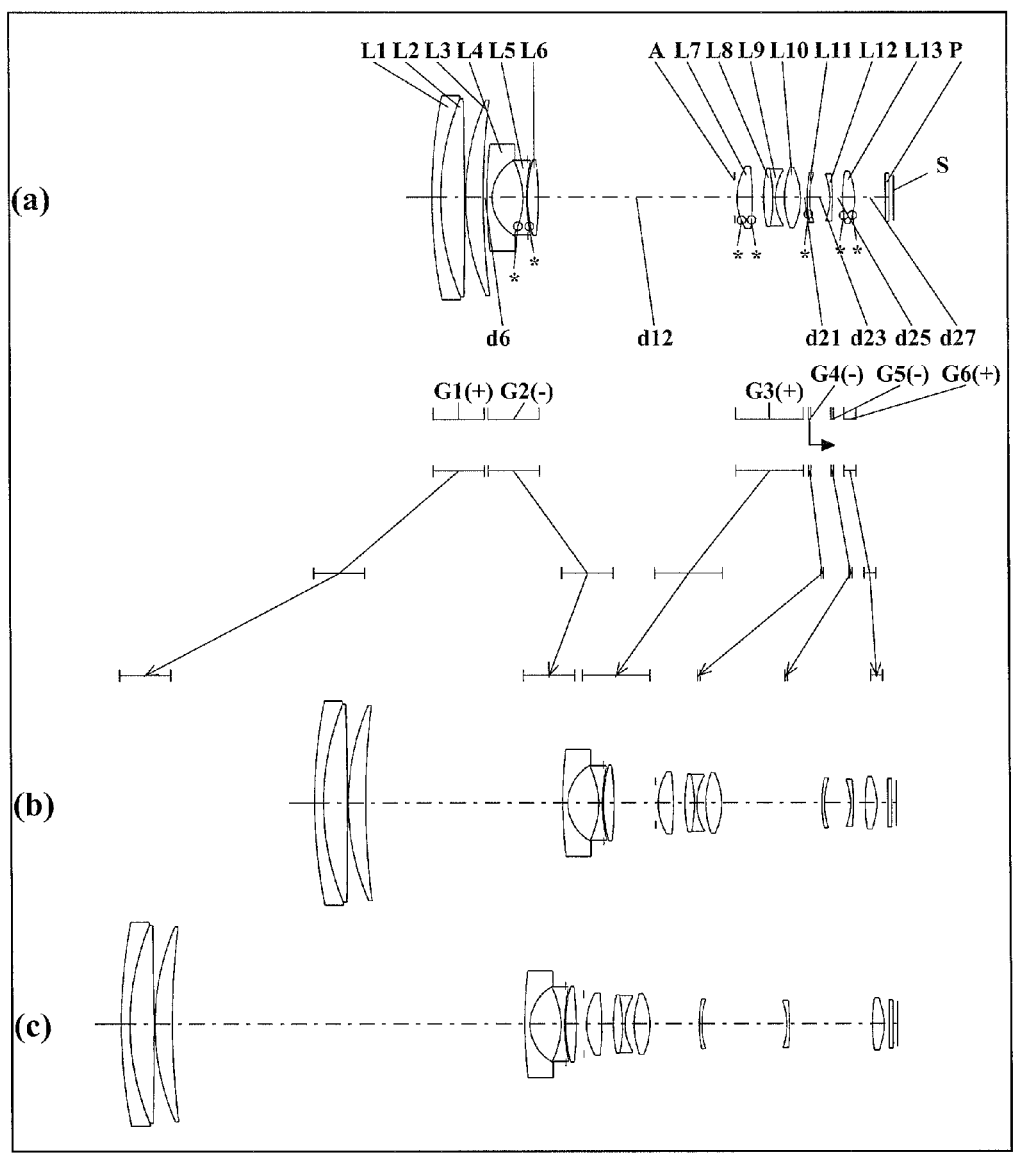
FIG. 7 is a lens arrangement diagram showing an infinity in-focus condition of a zoom lens system according to Embodiment 3 (Numerical Example 3)
Figure 8:
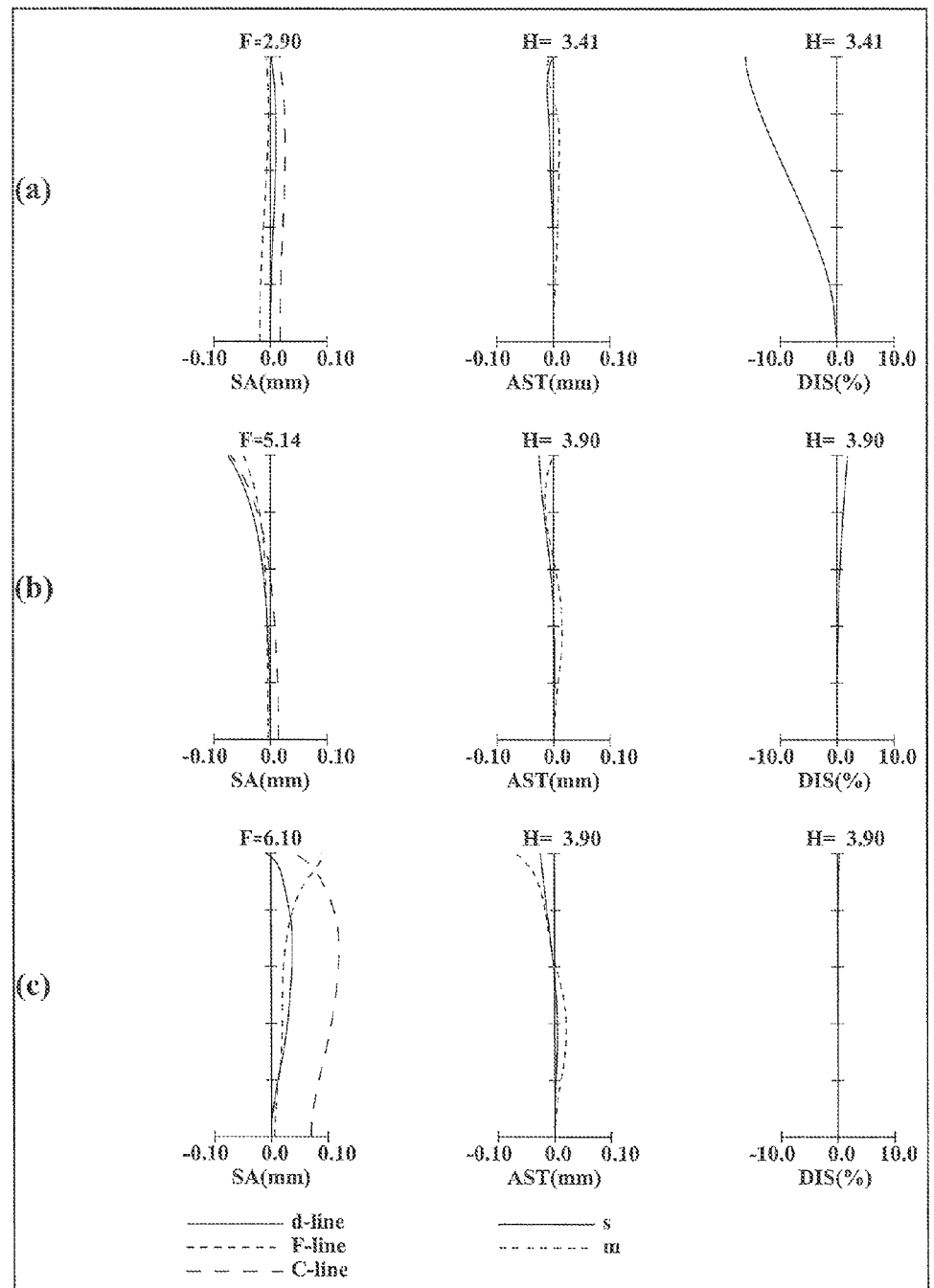
FIG. 8 is a longitudinal aberration diagram showing an infinity in-focus condition of the zoom lens system according to Numerical Example 3.
Figure 9:
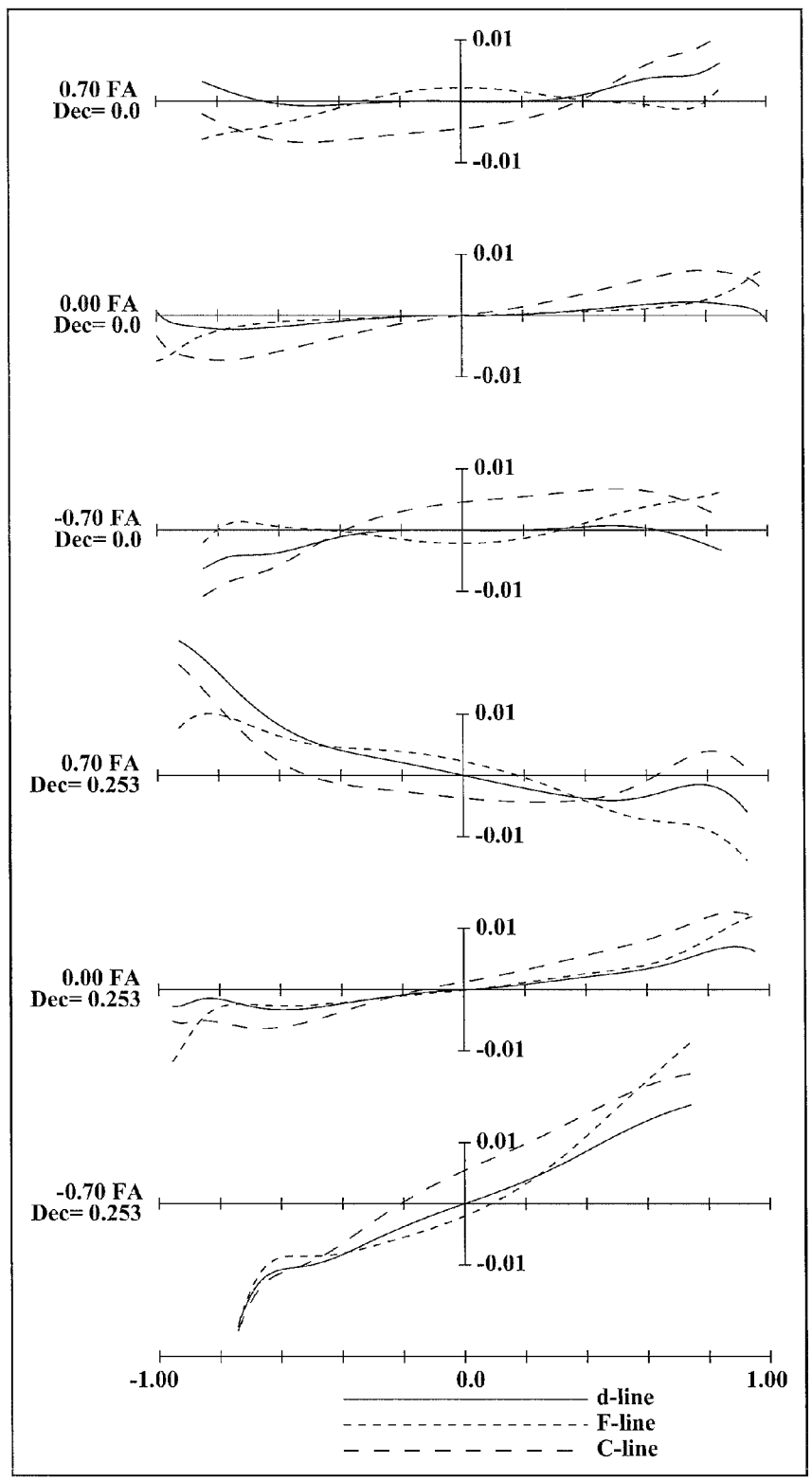
FIG. 9 is a lateral aberration diagram in a basic state where image blur compensation is not performed and in an image blur compensation state at a telephoto limit of the zoom lens system according to Numerical Example 3.

As shown in FIG. 7, the zoom lens system according to Embodiment 3, in order from the object side to the image side, comprises a first lens unit G1 having positive optical power, a second lens unit G2 having negative optical power, a third lens unit G3 having positive optical power, a fourth lens unit G4 having negative optical power, a fifth lens unit G5 having negative optical power, and a sixth lens unit G6 having positive optical power. In the zoom lens system according to Embodiment 3, since the respective lens units are arranged in the above optical power allocation, size reduction of the entire lens system is achieved while maintaining excellent optical performance.

The first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other. In the surface data of the corresponding Numerical Example described later, a surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a bi-concave fifth lens element L5; and a bi-convex sixth lens element L6. The fifth lens element L5 has two aspheric surfaces.

The third lens unit G3, in order from the object side to the image side, comprises: a bi-convex seventh lens element L7; a bi-convex eighth lens element L8; a bi-concave ninth lens element L9; and a bi-convex tenth lens element L10. Among these, the eighth lens element L8 and the ninth lens element L9 are cemented with each other. In the surface data of the corresponding Numerical Example described later, a surface number 17 is imparted to an adhesive layer between the eighth lens element L8 and the ninth lens element L9. The seventh lens element L7 has two aspheric surfaces.

The fourth lens unit G4 comprises solely a negative meniscus eleventh lens element L11 with the convex surface facing the object side.

The fifth lens unit G5 comprises solely a negative meniscus twelfth lens element L12 with the convex surface facing the image side.

The sixth lens unit G6 comprises solely a bi-convex thirteenth lens element L13. The thirteenth lens element L13 has two aspheric surfaces.

An aperture diaphragm A is disposed between the second lens unit G2 and the third lens unit G3.

In the zoom lens system according to Embodiment 3, the entirety of the third lens unit G3 corresponds to an image blur compensation lens unit described later which moves in a direction perpendicular to the optical axis to optically compensate for image blur.

In the zoom lens system according to Embodiment 3, in zooming from the wide-angle limit to the telephoto limit at the time of image taking, the first lens unit G1 moves to the object side, the second lens unit G2, the fourth lens unit G4, and the fifth lens unit G5 move with locus of a convex to the image side, the third lens unit G3 monotonically moves to the object side, and the sixth lens unit G6 moves to the image side. That is, in zooming, the first lens unit G1, the second lens unit G2, the third lens unit G3, the fourth lens unit G4, the fifth lens unit G5, and the sixth lens unit G6 individually move along the optical axis so that the interval between the first lens unit G1 and the second lens unit G2, the interval between the third lens unit G3 and the fourth lens unit G4, the interval between the fourth lens unit G4 and the fifth lens unit G5, and the interval between the fifth lens unit G5 and the sixth lens unit G6 increase, and the interval between the second lens unit G2 and the third lens unit G3 decreases.

In the zoom lens system according to Embodiment 3, in focusing from the infinity in-focus condition to the close-object in-focus condition, the fourth lens unit G4 as a focusing lens unit moves to the image side along the optical axis in any zooming condition.

The focusing lens unit may be the fifth lens unit G5 or the sixth lens unit G6.

[4. Embodiment 4(FIG. 10)]

Figure 10:
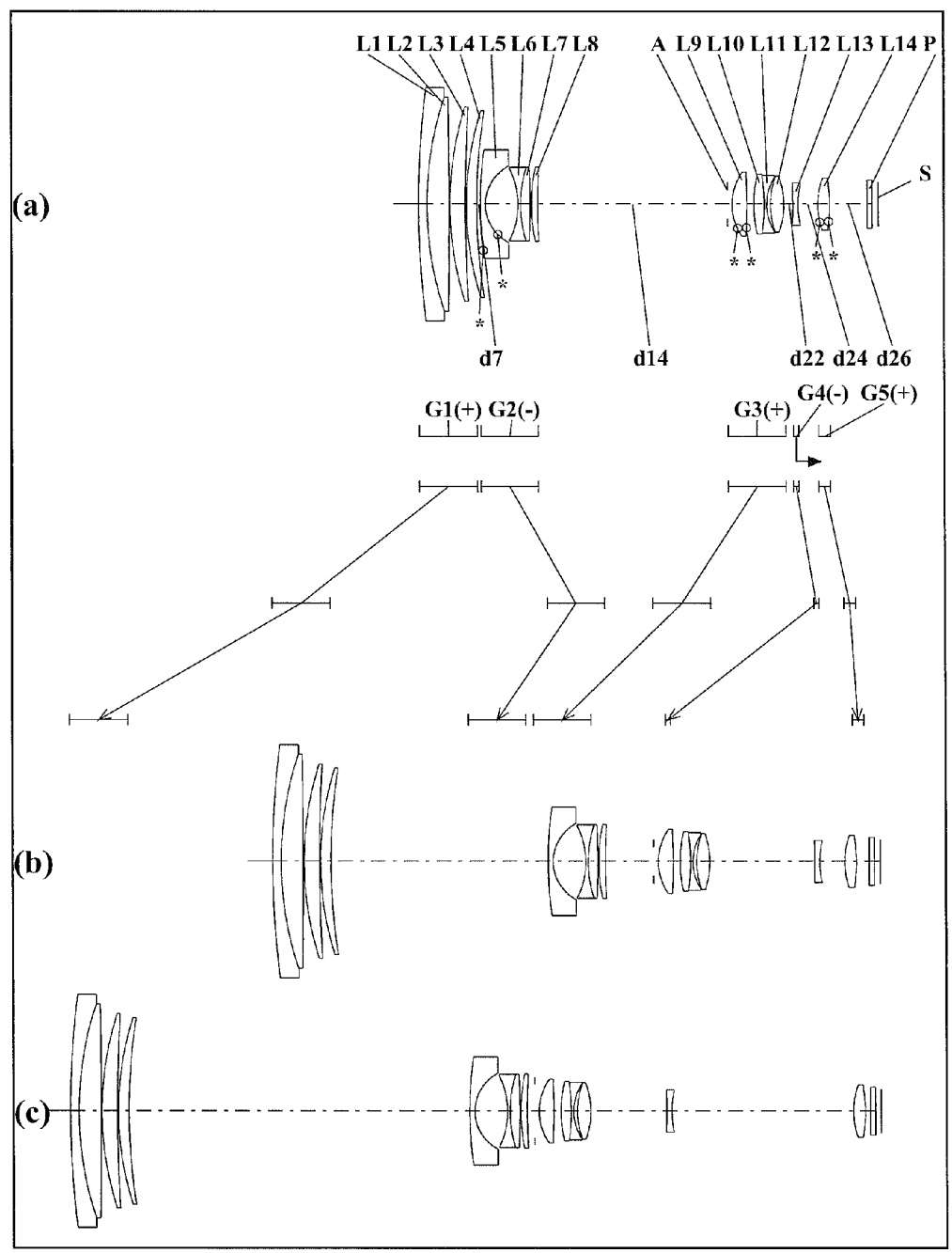
FIG. 10 is a lens arrangement diagram showing an infinity in-focus condition of a zoom lens system according to Embodiment 4 (Numerical Example 4)
Figure 11:
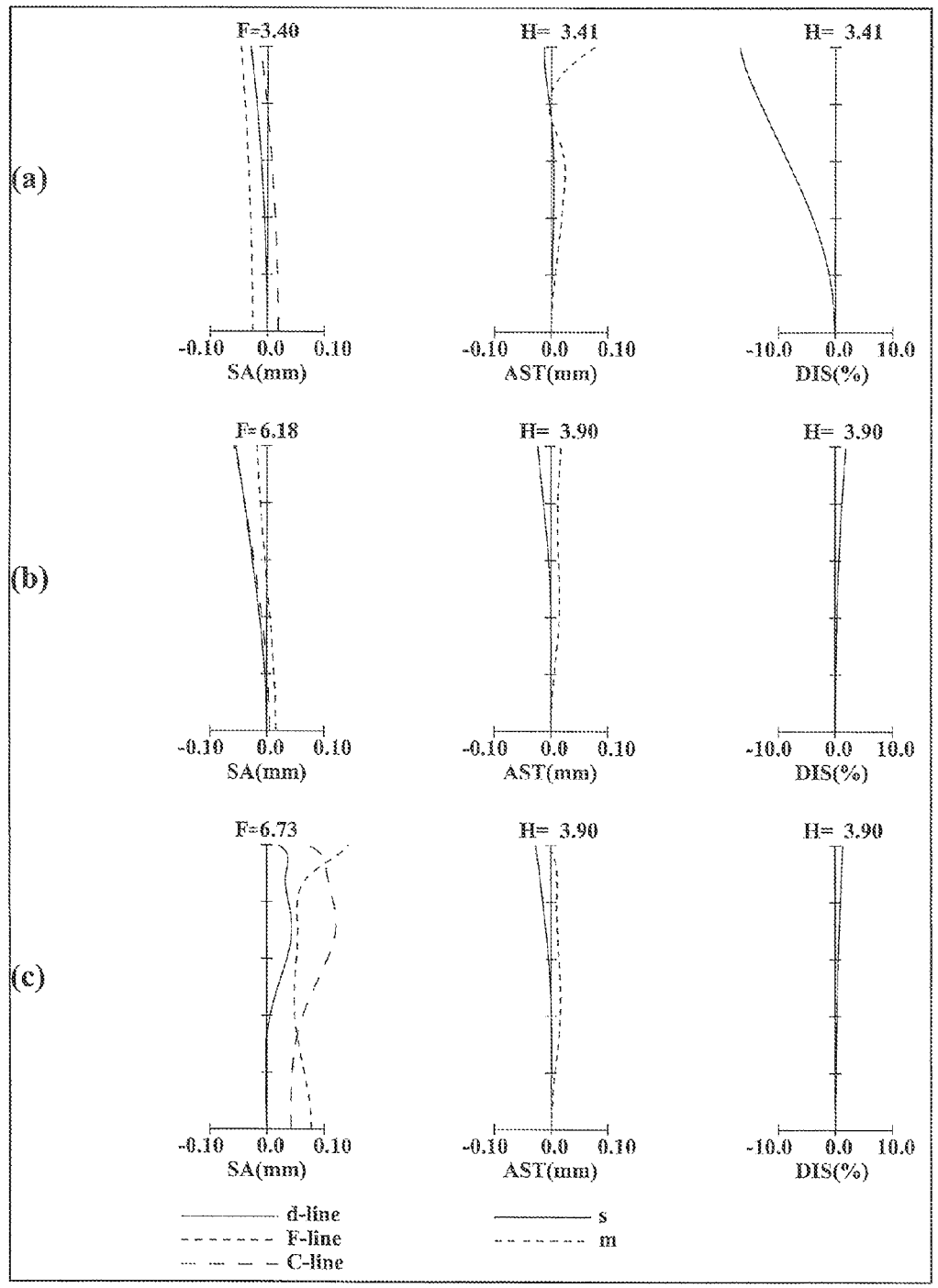
FIG. 11 is a longitudinal aberration diagram showing an infinity in-focus condition of the zoom lens system according to Numerical Example 4.
Figure 12:
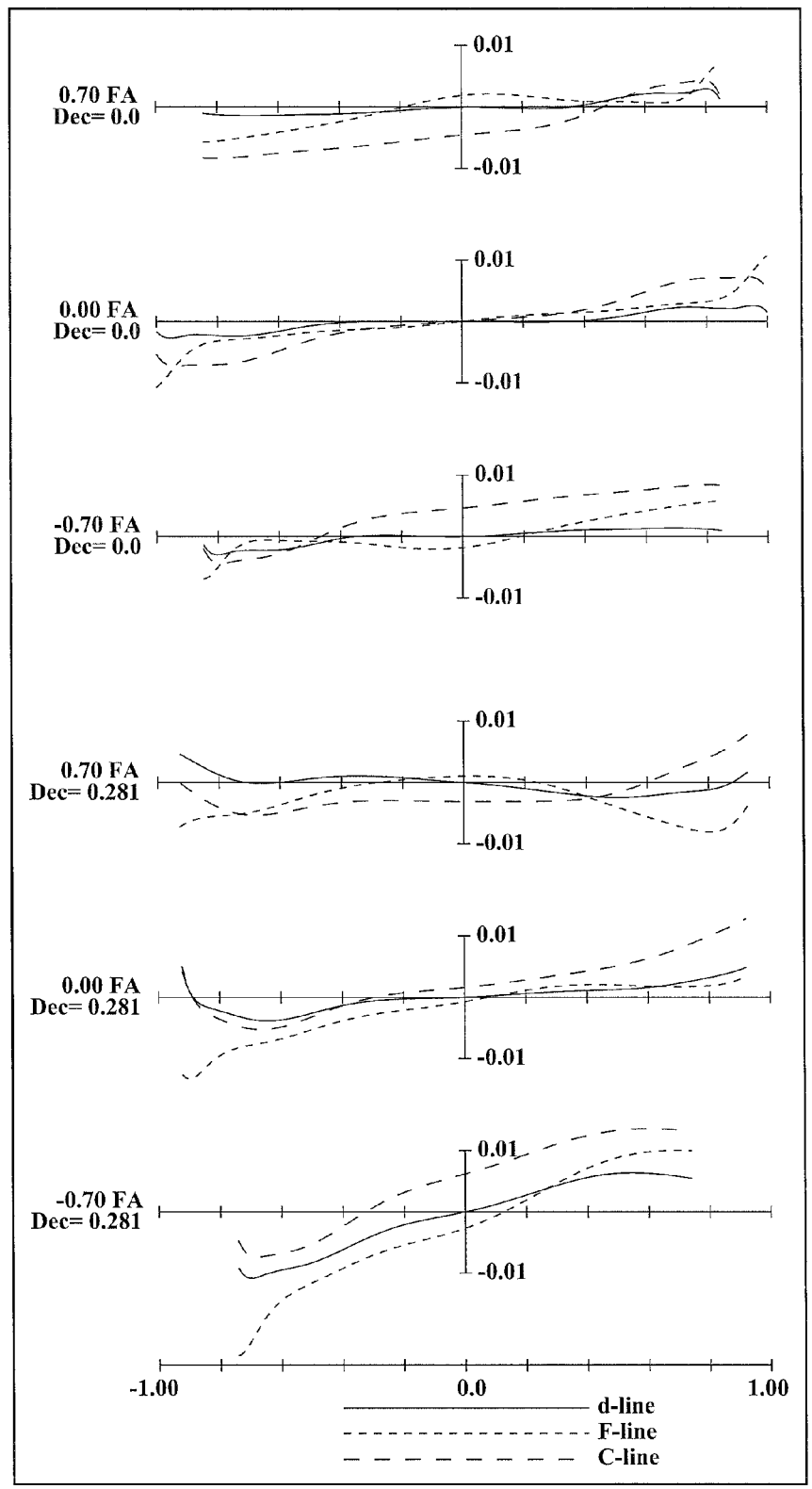
FIG. 12 is a lateral aberration diagram in a basic state where image blur compensation is not performed and in an image blur compensation state at a telephoto limit of the zoom lens system according to Numerical Example 4.

As shown in FIG. 10, the zoom lens system according to Embodiment 4, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power. In the zoom lens system according to Embodiment 4, since the respective lens units are arranged in the above optical power allocation, size reduction of the entire lens system is achieved while maintaining excellent optical performance.

The first lens unit G1, in order from the object side to the image side, comprises: a negative meniscus first lens element L1 with the convex surface facing the object side; a bi-convex second lens element L2; a positive meniscus third lens element L3 with the convex surface facing the object side; and a positive meniscus fourth lens element L4 with the convex surface facing the object side. Among these, the first lens element L1 and the second lens element L2 are cemented with each other.

The second lens unit G2, in order from the object side to the image side, comprises: a negative meniscus fifth lens element L5 with the convex surface facing the object side; a bi-concave sixth lens element L6; a bi-convex seventh lens element L7; and a positive meniscus eighth lens element L8 with the convex surface facing the object side. Among these, the sixth lens element L6 and the seventh lens element L7 are cemented with each other. The fifth lens element L5 has two aspheric surfaces.

The third lens unit G3, in order from the object side to the image side, comprises: a bi-convex ninth lens element L9; a bi-convex tenth lens element L10; a bi-concave eleventh lens element L11; and a bi-convex twelfth lens element L12. Among these, the tenth lens element L10 and the eleventh lens element L11 are cemented with each other. The ninth lens element L9 has two aspheric surfaces.

The fourth lens unit G4 comprises solely a bi-concave thirteenth lens element L13.

The fifth lens unit G5 comprises solely a bi-convex fourteenth lens element L14. The fourteenth lens element L14 has two aspheric surfaces.

An aperture diaphragm A is disposed between the second lens unit G2 and the third lens unit G3.

In the zoom lens system according to Embodiment 4, the entirety of the third lens unit G3 corresponds to an image blur compensation lens unit described later which moves in a direction perpendicular to the optical axis to optically compensate for image blur.

In the zoom lens system according to Embodiment 4, in zooming from the wide-angle limit to the telephoto limit at the time of image taking, the first lens unit G1 moves to the object side, the second lens unit G2 and the fourth lens unit G4 move with locus of a convex to the image side, the third lens unit G3 monotonically moves to the object side, and the fifth lens unit G5 moves to the image side. That is, in zooming, the first lens unit G1, the second lens unit G2, the third lens unit G3, the fourth lens unit G4, and the fifth lens unit G5 individually move along the optical axis so that the interval between the first lens unit G1 and the second lens unit G2, the interval between the third lens unit G3 and the fourth lens unit G4, and the interval between the fourth lens unit G4 and the fifth lens unit G5 increase, and the interval between the second lens unit G2 and the third lens unit G3 decreases.

In the zoom lens system according to Embodiment 4, in focusing from the infinity in-focus condition to the close-object in-focus condition, the fourth lens unit G4 as a focusing lens unit moves to the image side along the optical axis in any zooming condition.

The focusing lens unit may be the fifth lens unit G5.

[5. Embodiment 5(FIG. 13)]

Figure 13:
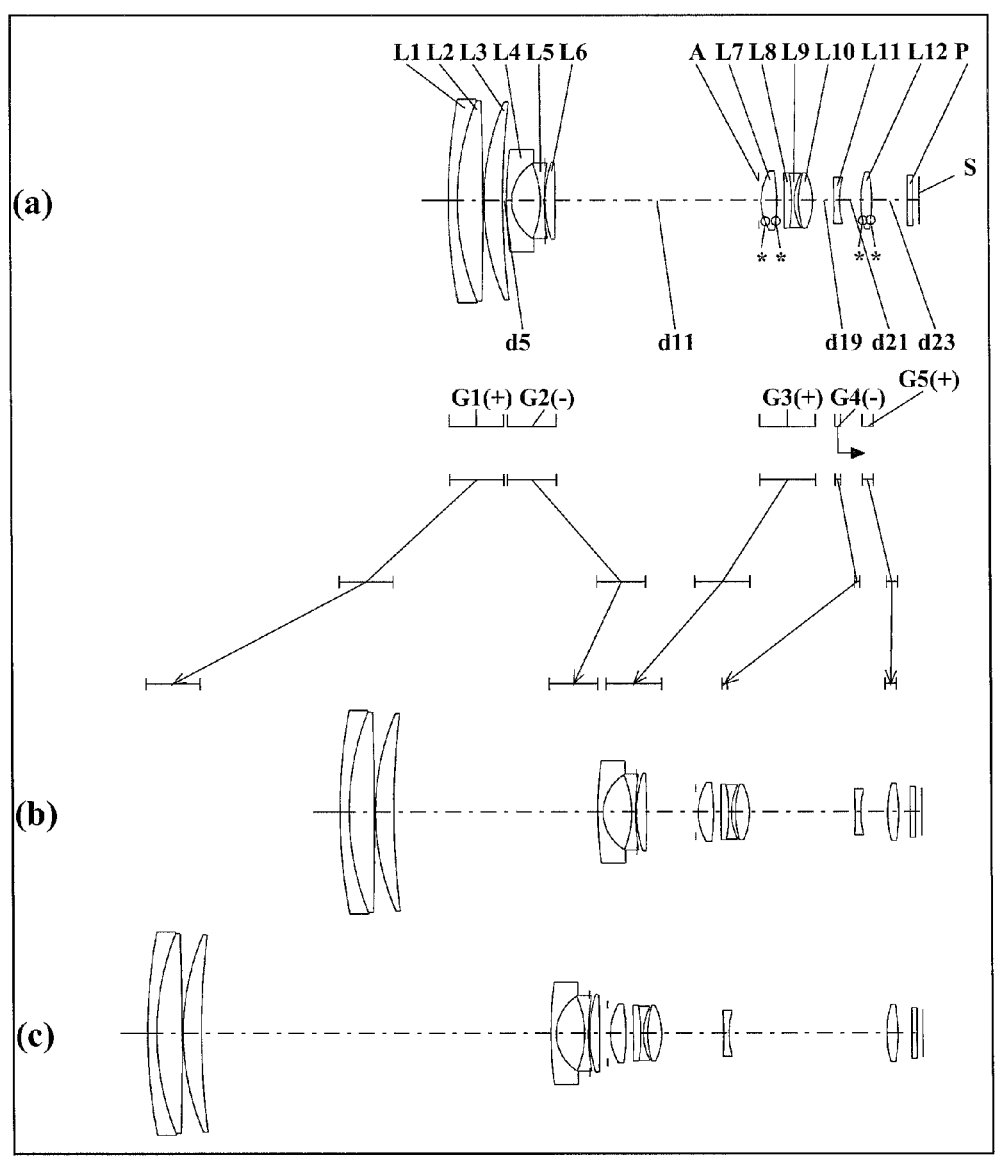
FIG. 13 is a lens arrangement diagram showing an infinity in-focus condition of a zoom lens system according to Embodiment 5 (Numerical Example 5)
Figure 14:
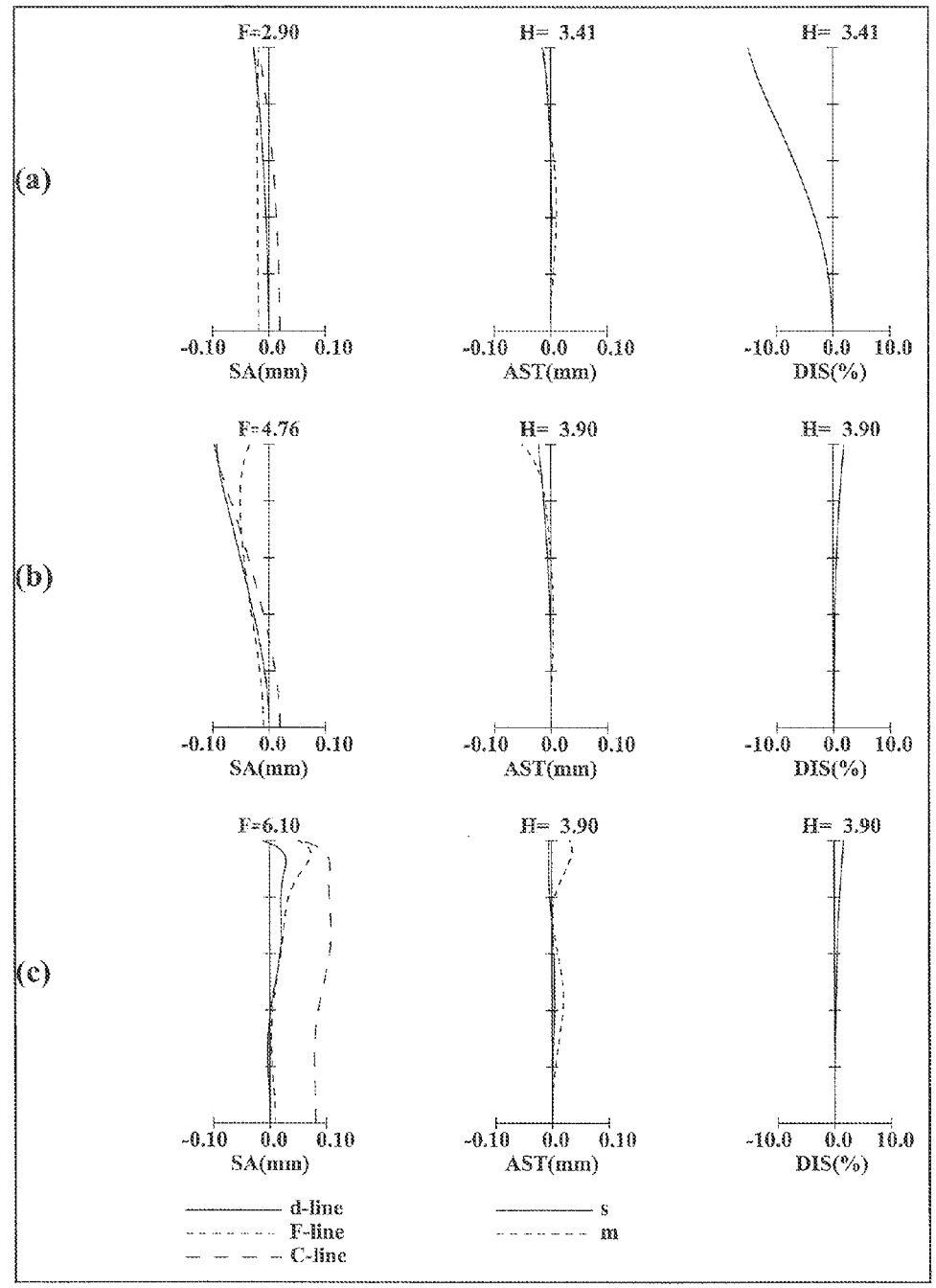
FIG. 14 is a longitudinal aberration diagram showing an infinity in-focus condition of the zoom lens system according to Numerical Example 5.
Figure 15:
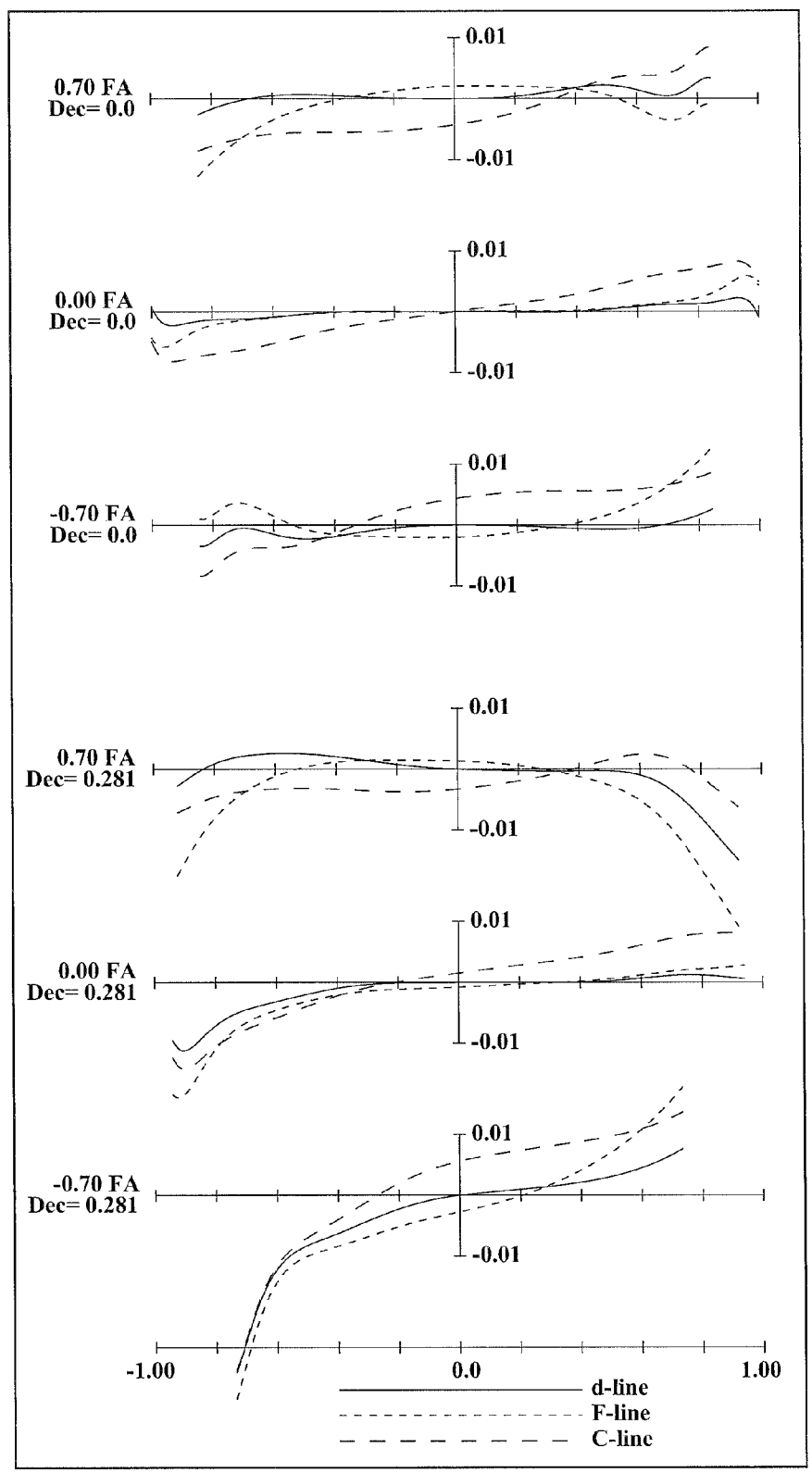
FIG. 15 is a lateral aberration diagram in a basic state where image blur compensation is not performed and in an image blur compensation state at a telephoto limit of the zoom lens system according to Numerical Example 5.

As shown in FIG. 13, the zoom lens system according to Embodiment 5, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power. In the zoom lens system according to Embodiment 5, since the respective lens units are arranged in the above optical power allocation, size reduction of the entire lens system is achieved while maintaining excellent optical performance.

The first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; and a bi-convex sixth lens element L6.

The third lens unit G3, in order from the object side to the image side, comprises: a bi-convex seventh lens element L7; a positive meniscus eighth lens element L8 with the convex surface facing the image side; a bi-concave ninth lens element L9; and a bi-convex tenth lens element L10. Among these, the eighth lens element L8 and the ninth lens element L9 are cemented with each other. The seventh lens element L7 has two aspheric surfaces.

The fourth lens unit G4 comprises solely a bi-concave eleventh lens element L11.

The fifth lens unit G5 comprises solely a bi-convex twelfth lens element L12. The twelfth lens element L12 has two aspheric surfaces.

An aperture diaphragm A is disposed between the second lens unit G2 and the third lens unit G3.

In the zoom lens system according to Embodiment 5, the entirety of the third lens unit G3 corresponds to an image blur compensation lens unit described later which moves in a direction perpendicular to the optical axis to optically compensate for image blur.

In the zoom lens system according to Embodiment 5, in zooming from the wide-angle limit to the telephoto limit at the time of image taking, the first lens unit G1 moves to the object side, the second lens unit G2 and the fourth lens unit G4 move with locus of a convex to the image side, the third lens unit G3 monotonically moves to the object side, and the fifth lens unit G5 moves to the image side. That is, in zooming, the first lens unit G1, the second lens unit G2, the third lens unit G3, the fourth lens unit G4, and the fifth lens unit G5 individually move along the optical axis so that the interval between the first lens unit G1 and the second lens unit G2, the interval between the third lens unit G3 and the fourth lens unit G4, and the interval between the fourth lens unit G4 and the fifth lens unit G5 increase, and the interval between the second lens unit G2 and the third lens unit G3 decreases.

In the zoom lens system according to Embodiment 5, in focusing from the infinity in-focus condition to the close-object in-focus condition, the fourth lens unit G4 as a focusing lens unit moves to the image side along the optical axis in any zooming condition.

The focusing lens unit may be the fifth lens unit G5.

[6. Summary of Embodiments 1 to 5]

As described above, Embodiments 1 to 5 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that a zoom lens system like the zoom lens systems according to Embodiments 1 to 5 can satisfy. Here, a plurality of beneficial conditions are set forth for the zoom lens system according to each embodiment. A construction that satisfies all the plurality of conditions is most effective for the zoom lens system. However, when an individual condition is satisfied, a zoom lens system having the corresponding effect is obtained.

For example, in a zoom lens system like the zoom lens systems according to Embodiments 1 to 5, which includes, in order from the object side to the image side, a first lens unit having positive optical power, a second lens unit having negative optical power, a third lens unit having positive optical power, a fourth lens unit having optical power, and a fifth lens unit having optical power and in which, in zooming from a wide-angle limit to a telephoto limit at the time of image taking, at least the first lens unit, the second lens unit, and the third lens unit move along the optical axis so that the interval between the first lens unit and the second lens unit at the telephoto limit becomes larger than that at the wide-angle limit and the interval between the second lens unit and the third lens unit at the telephoto limit becomes narrower than that at the wide-angle limit, and an aperture diaphragm is disposed between the second lens unit and the third lens unit (this lens configuration is referred to as a basic configuration of the embodiments, hereinafter), the following condition (1) is satisfied:

$$18.5 < f_{G1}/f_W < 30.0 \quad (1)$$

where $f_{G1}$ is the focal length of the first lens unit, and $f_W$ is the focal length of the entire system at the wide-angle limit The condition (1) sets forth the ratio of the focal length of the first lens unit to the focal length of the entire system at the wide-angle limit. When the value goes below the lower limit of the condition (1), the focal length of the first lens unit becomes excessively short, which makes it difficult to compensate for various aberrations over the entire system and to ensure desired optical performance. When the value exceeds the upper limit of the condition (1), the focal length of the first lens unit becomes excessively long, whereby the amount of movement of the first lens unit in zooming is increased and the overall length of the lens system is excessively increased, which makes it difficult to provide a compact lens barrel, imaging device, and camera.

When at least one of the following conditions (1)' and (1)" is further satisfied, the above-mentioned effect is achieved more successfully.

$$19.5 < f_{G1}/f_W \quad (1)'$$

$$f_{G1}/f_W < 25.0 \quad (1)''$$

Each of the zoom lens systems according to Embodiments 1 to 3 is a zoom lens system having the basic configuration and including the sixth lens unit having optical power, on the image side relative to the fifth lens unit.

In the zoom lens systems according to Embodiments 1 and 2, the fourth lens unit has positive optical power, the fifth lens unit has negative optical power, the sixth lens unit has positive optical power, and the fourth lens unit is a focusing lens unit that moves along the optical axis in focusing from the infinity in-focus condition to the close-object in-focus condition. In zooming from the wide-angle limit to the telephoto limit at the time of image taking, the respective lens units move along the optical axis so that the interval between the third lens unit and the fourth lens unit at the telephoto limit becomes larger than that at the wide-angle limit. For example, it is beneficial for a zoom lens system like the zoom lens systems according to Embodiments 1 and 2 to satisfy the following condition (2):

$$1.1 < m_{6T}/m_{6W} < 2.0 \quad (2)$$

where $m_{6T}$ is the lateral magnification of the sixth lens unit at the telephoto limit, and $m_{6W}$ is the lateral magnification of the sixth lens unit at the wide-angle limit.

In the zoom lens system according to Embodiment 3, the fourth lens unit has negative optical power, the fifth lens unit has negative optical power, the sixth lens unit has positive optical power, and the fourth lens unit is a focusing lens unit that moves along the optical axis in focusing from the infinity in-focus condition to the close-object in-focus condition. In zooming from the wide-angle limit to the telephoto limit at the time of image taking, the respective lens units move along the optical axis so that the interval between the third lens unit and the fourth lens unit at the telephoto limit becomes larger than that at the wide-angle limit For example, it is beneficial for a zoom lens system like the zoom lens system according to Embodiment 3 to satisfy the above condition (2).

The condition (2) sets forth the ratio of the lateral magnification of the sixth lens unit at the telephoto limit to the lateral magnification of the sixth lens unit at the wide-angle limit. When the value goes below the lower limit of the condition (2), the lateral magnification of the sixth lens unit at the telephoto limit becomes excessively small, which makes it difficult to compensate for various aberrations, particularly the curvature of field. When the value exceeds the upper limit of the condition (2), the lateral magnification of the sixth lens unit at the wide-angle limit becomes excessively small, which makes it difficult to compensate for various aberrations, particularly the curvature of field.

When at least one of the following conditions (2)' and (2)" is further satisfied, the above-mentioned effect is achieved more successfully.

$$1.3 < m_{6T}/m_{6W} \quad (2)'$$

$$m_{6T}/m_{6W} < 1.8 \quad (2)''$$

In the zoom lens systems according to Embodiments 4 and 5, in the zoom lens system having the basic configuration, the fourth lens unit has negative optical power, the fifth lens unit has positive optical power, and the fourth lens unit is a focusing lens unit that moves along the optical axis in focusing from the infinity in-focus condition to the close-object in-focus condition. In zooming from the wide-angle limit to the telephoto limit at the time of image taking, the respective lens units move along the optical axis so that the interval between the third lens unit and the fourth lens unit at the telephoto limit becomes larger than that at the wide-angle limit. For example, it is beneficial for a zoom lens system like the zoom lens systems according to Embodiments 4 and 5 to satisfy the following condition (3):

$$1.1 < m_{5T}/m_{5W} < 2.0 \quad (3)$$

where $M_{5T}$ is the lateral magnification of the fifth lens unit at the telephoto limit, and $m_{5W}$ is the lateral magnification of the fifth lens unit at the wide-angle limit The condition (3) sets forth the ratio of the lateral magnification of the fifth lens unit at the telephoto limit to the lateral magnification of the fifth lens unit at the wide-angle limit When the value goes below the lower limit of the condition (3), the lateral magnification of the fifth lens unit at the telephoto limit becomes excessively small, which makes it difficult to compensate for various aberrations, particularly the curvature of field. When the value exceeds the upper limit of the condition (3), the lateral magnification of the fifth lens unit at the wide-angle limit becomes excessively small, which makes it difficult to compensate for various aberrations, particularly the curvature of field.

When at least one of the following conditions (3)' and (3)" is further satisfied, the above-mentioned effect is achieved more successfully.

$$1.3 < m_{5T}/m_{5W} \quad (3)'$$

$$m_{5T}/m_{5W} < 1.8 \quad (3)''$$

In each of the zoom lens systems according to the present disclosure, any one of the lens units constituting the zoom lens system or a sub lens unit corresponding to a part of each lens unit can be used as an image blur compensation lens unit that moves in a direction perpendicular to the optical axis to optically compensate for image blur. In the zoom lens systems according to Embodiments 1 to 5, by moving the entirety of the third lens unit G3 in the direction perpendicular to the optical axis, image point movement caused by vibration of the entire system is compensated. That is, image blur caused by hand blurring, vibration and the like is optically compensated.

When compensating for the image point movement caused by vibration of the entire system, the image blur compensation lens unit moves in the direction perpendicular to the optical axis. Thereby, image blur can be compensated for in a state that size increase in the entire zoom lens system is suppressed to realize a compact configuration and that excellent imaging characteristics such as small decentering coma aberration and small decentering astigmatism are satisfied.

In the case where one lens unit is composed of a plurality of lens elements, the sub lens unit corresponding to a part of each lens unit is any one lens element or a plurality of adjacent lens elements among the plurality of lens elements.

Each of the lens units constituting the zoom lens systems according to Embodiments 1 to 5 is composed exclusively of refractive type lens elements that deflect the incident light by refraction (that is, lens elements of a type in which deflection is achieved at the interface between media each having a distinct refractive index). However, the present disclosure is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in the refractive-diffractive hybrid type lens elements, when a diffraction structure is formed in the interface between media having mutually different refractive indices, wavelength dependence in the diffraction efficiency is improved.

(Embodiment 6)

Figure 16:
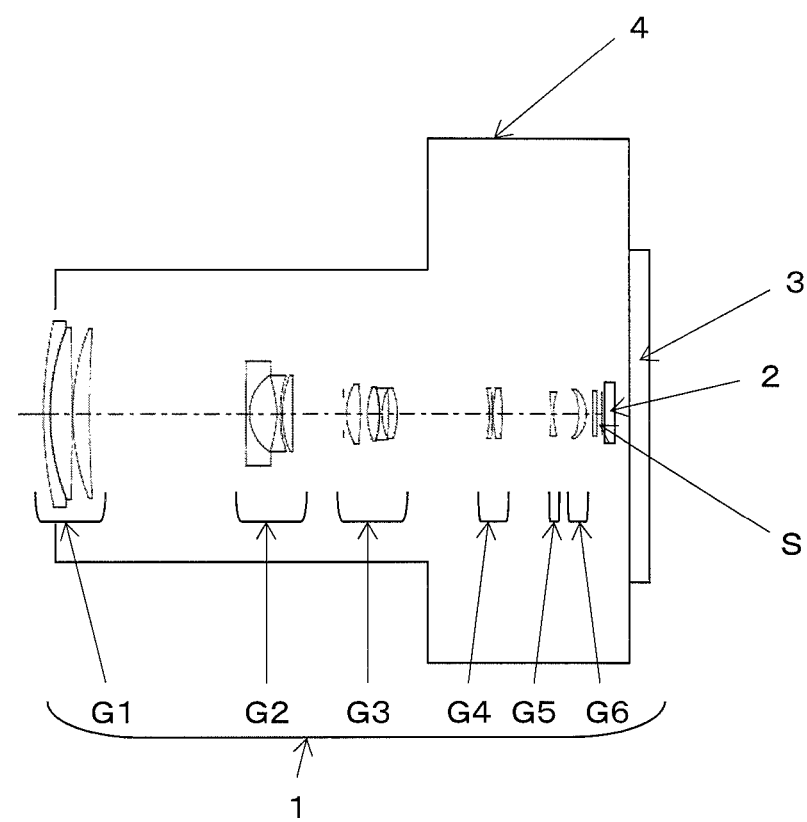
FIG. 16 is a schematic block diagram of a digital still camera according to Embodiment 6.

FIG. 16 is a schematic configuration diagram of a digital still camera according to Embodiment 6. In FIG. 16, the digital still camera comprises a zoom lens system 1, an image sensor 2, a liquid crystal display monitor 3, and a body 4. An imaging device includes the zoom lens system 1 and the image sensor 2. The zoom lens system 1 comprises a first lens unit G1, a second lens unit G2, a third lens unit G3, a fourth lens unit G4, a fifth lens unit G5, and a sixth lens unit G6. In the body 4, the zoom lens system 1 is arranged on the front side, while the image sensor 2 is arranged on the rear side of the zoom lens system 1. On the rear side of the body 4, the liquid crystal display monitor 3 is arranged. An optical image of a photographic object generated by the zoom lens system 1 is formed on an image surface S.

FIG. 16 shows the case where the zoom lens system according to Embodiment 1 is used as the zoom lens system 1. However, any one of the zoom lens systems according to Embodiments 2 to 5 may be used instead of the zoom lens system according to Embodiment 1. Further, the optical system of the digital still camera shown in FIG. 16 is applicable also to a digital video camera for moving images. In this case, moving images with high resolution can be acquired in addition to still images.

As described above, Embodiment 6 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Furthermore, an imaging device composed of a zoom lens system according to any one of Embodiments 1 to 5 and an image sensor such as a CCD or a CMOS may be applied to a camera for a mobile terminal device such as a smartphone, a surveillance camera in a surveillance system, a Web camera, a vehicle-mounted camera or the like.

NUMERICAL EXAMPLES

The following description is given for numerical examples in which the zoom lens system according to Embodiments 1 to 5 are implemented practically. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression:

$$Z = \frac{h^2/r}{1 + \sqrt{1-(1+\kappa)(h/r)^2}} + \sum A_n h^n$$

where

Z is the distance from a point on an aspherical surface at a height h relative to the optical axis to a tangential plane at the vertex of the aspherical surface, h is the height relative to the optical axis, r is the radius of curvature at the top, κ is the conic constant, and $A_n$ is the n-th order aspherical coefficient.

FIGS. 2, 5, 8, 11, and 14 are longitudinal aberration diagrams of the zoom lens systems according to Embodiments 1 to 5, respectively.

In each longitudinal aberration diagram, part (a) shows the aberration at a .wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Figure, indicated as F), and the solid line, the short dash line, the long dash line and the one-dot dash line indicate the characteristics to the d-line, the F-line, the C-line and the g-line, respectively. In each astigmatism diagram, the vertical axis indicates the image height (in each Figure, indicated as H), and the solid line and the dash line indicate the characteristics to the sagittal plane (in each Figure, indicated as "s") and the meridional plane (in each Figure, indicated as "m"), respectively. In each distortion diagram, the vertical axis indicates the image height (in each Figure, indicated as H).

FIGS. 3, 6, 9, 12, and 15 are lateral aberration diagrams of the zoom lens systems at a telephoto limit according to Embodiments 1 to 5, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blue compensation lens unit (the entirety of the third lens unit G3) is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line, the long dash line and the one-dot dash line indicate the characteristics to the d-line, the F-line, the C-line and the g-line, respectively. In each lateral aberration diagram, the meridional plane is adopted as the plane containing the optical axis of the first lens unit G1 and the optical axis of the third lens unit G3.

Here, in the zoom lens system according to each example, the amount of movement of the third lens unit G3 in a direction perpendicular to the optical axis in an image blur compensation state at a telephoto limit is as follows.

| Example | Amount of movement (mm) |
|---|---|
| 1 | 0.337 |
| 2 | 0.310 |
| 3 | 0.253 |
| 4 | 0.281 |
| 5 | 0.281 |

Here, when the shooting distance is infinity, at a telephoto limit, the amount of image decentering in a case that the zoom lens system inclines by a predetermined angle is equal to the amount of image decentering in a case that the image blue compensation lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to the predetermined angle without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows the various data in the infinity in-focus condition.

TABLE 1

(surface data)

| Surface number | r | d | nd | vd |
|---|---|---|---|---|
| Object surface | ∞ | | | |
| 1 | 86.00230 | 1.35000 | 1.80610 | 33.3 |
| 2 | 47.46400 | 0.01000 | 1.56732 | 42.8 |
| 3 | 47.46400 | 4.43550 | 1.49700 | 81.6 |
| 4 | −1202.97800 | 0.20000 | | |
| 5 | 47.37700 | 3.43110 | 1.49700 | 81.6 |
| 6 | 281.37970 | Variable | | |
| 7 | 547.82520 | 0.70000 | 1.80420 | 46.5 |
| 8 | 9.41650 | 5.55540 | | |
| 9* | −16.51970 | 0.70000 | 1.76681 | 49.7 |
| 10* | 38.34820 | 0.43500 | | |
| 11 | 20.80940 | 2.08260 | 1.94595 | 18.0 |
| 12 | 947.29690 | Variable | | |
| 13(Diaphragm) | ∞ | 0.50000 | | |
| 14* | 11.72260 | 2.86640 | 1.58332 | 59.1 |
| 15* | −40.62510 | 1.38970 | | |
| 16 | 14.51810 | 2.45190 | 1.49700 | 81.6 |
| 17 | −19.87650 | 0.01000 | 1.56732 | 42.8 |
| 18 | −19.87650 | 0.50000 | 1.80610 | 33.3 |
| 19 | 11.28530 | 1.32450 | | |
| 20 | −73.09930 | 1.90480 | 1.58144 | 40.9 |
| 21 | −14.37870 | Variable | | |
| 22* | −25.35330 | 0.60000 | 1.63550 | 23.9 |
| 23 | −54.00470 | 0.20000 | | |
| 24 | 22.14390 | 1.80540 | 1.54410 | 56.1 |
| 25* | −40.03450 | Variable | | |
| 26* | −162.84400 | 0.60000 | 1.54410 | 56.1 |
| 27 | 15.56530 | Variable | | |
| 28* | −31.01180 | 1.64060 | 1.54410 | 56.1 |
| 29* | −7.95930 | Variable | | |
| 30 | ∞ | 0.78000 | 1.51680 | 64.2 |
| 31 | ∞ | (BF) | | |
| Image surface | ∞ | | | |

TABLE 2

(Aspherical data)

Surface No. 9

K = 0.00000E+00, A4 = 6.42418E−05, A6 = 5.26538E−06, A8 = −8.74983E−08
A10 = 4.12908E−10

Surface No. 10

K = 0.00000E+00, A4 = 1.00415E−04, A6 = 3.41384E−06, A8 = −7.51738E−08
A10 = 3.89772E−10

Surface No. 14

K = 0.00000E+00, A4 = −5.21767E−05, A6 = −5.23261E−07, A8 = 2.42438E−09
A10 = −1.47501E−10

Surface No. 15

K = 0.00000E+00, A4 = 5.17974E−05, A6 = −5.38305E−07, A8 = −3.81085E−09
A10 = −2.33806E−11

Surface No. 22

K = 0.00000E+00, A4 = −1.51018E−05, A6 = 1.20032E−07, A8 = −1.27960E−08
A10 = −1.29107E−10

Surface No. 25

K = 0.00000E+00, A4 = −5.21956E−07, A6 = 1.99204E−07, A8 = −1.50590E−08
A10 = 6.63478E−11

Surface No. 26

K = 0.00000E+00, A4 = −6.60473E−05, A6 = 3.19059E−06, A8 = −3.64389E−07
A10 = 1.28053E−08

Surface No. 28

K = 0.00000E+00, A4 = −1.27868E−03, A6 = 4.29123E−05, A8 = −3.15128E−06
A10 = 3.42649E−08

Surface No. 29

K = 0.00000E+00, A4 = −8.50894E−04, A6 = 6.45084E−05, A8 = −3.84172E−06
A10 = 5.33891E−08

TABLE 3

(Various data in infinity in-focus condition)

Zooming ratio 56.00512

| | Wide-angle limit | Middle position | Telephoto limit |
|---|---|---|---|
| Focal length | 3.7098 | 27.7644 | 207.7671 |
| F-number | 2.90020 | 5.67685 | 6.10109 |
| Half view angle | 47.7568 | 7.8898 | 1.0597 |
| Image height | 3.4080 | 3.9020 | 3.9020 |
| Overall length of lens system | 90.8772 | 113.6060 | 149.9617 |
| BF | 0.86547 | 0.87350 | 0.83168 |
| d6 | 0.5000 | 31.9869 | 61.3438 |
| d12 | 41.9101 | 10.3600 | 1.5000 |
| d21 | 2.4927 | 18.6493 | 32.5536 |
| d25 | 2.0073 | 9.8558 | 3.0040 |
| d27 | 2.0000 | 5.0000 | 13.9874 |
| d29 | 5.6287 | 1.4076 | 1.2683 |

Zoom lens unit data

| Lens unit | Initial surface No. | Focal length |
|---|---|---|
| 1 | 1 | 83.68280 |
| 2 | 7 | −8.99464 |
| 3 | 13 | 19.12526 |
| 4 | 22 | 39.62290 |
| 5 | 26 | −26.08067 |
| 6 | 28 | 19.19766 |

Numerical Example 2

The zoom lens system of Numerical Example 2 corresponds to Embodiment 2 shown in FIG. 4. Table 4 shows the surface data of the zoom lens system of Numerical Example 2. Table 5 shows aspherical data. Table 6 shows various data in infinity in-focus condition.

TABLE 4

(surface data)

| Surface number | r | d | nd | vd |
|---|---|---|---|---|
| Object surface | ∞ | | | |
| 1 | 104.45080 | 1.35000 | 1.80610 | 33.3 |
| 2 | 50.90580 | 0.01000 | 1.56732 | 42.8 |
| 3 | 50.90580 | 4.82620 | 1.49700 | 81.6 |
| 4 | −543.08740 | 0.20000 | | |
| 5 | 46.82610 | 3.46080 | 1.59282 | 68.6 |
| 6 | 152.61140 | Variable | | |
| 7 | 133.53650 | 0.70000 | 1.80420 | 46.5 |
| 8 | 8.49340 | 5.81150 | | |
| 9* | −13.83640 | 0.70000 | 1.77200 | 50.0 |
| 10* | 63.83110 | 0.42060 | | |
| 11 | 29.35740 | 1.95420 | 1.94595 | 18.0 |
| 12 | −70.15780 | Variable | | |
| 13(Diaphragm) | ∞ | 0.50000 | | |
| 14 | 11.49050 | 2.15370 | 1.62041 | 60.3 |
| 15 | 100.00000 | 4.03840 | | |
| 16* | 15.46890 | 3.44350 | 1.55332 | 71.7 |
| 17 | −11.07510 | 0.01000 | 1.56732 | 42.8 |
| 18 | −11.07510 | 0.50000 | 1.80610 | 33.3 |
| 19 | 17.02280 | 0.96520 | | |
| 20 | 361.75920 | 1.76250 | 1.54410 | 56.1 |
| 21 | −14.30370 | Variable | | |
| 22 | 17.31510 | 1.11230 | 1.54410 | 56.1 |
| 23 | 82.78790 | Variable | | |
| 24 | −27.70670 | 0.50000 | 1.49700 | 81.6 |
| 25 | 12.25950 | Variable | | |
| 26* | 26.33220 | 2.56000 | 1.54410 | 56.1 |
| 27* | −10.81750 | Variable | | |

TABLE 4-continued (surface data)

| Surface number | r | d | nd | vd |
|---|---|---|---|---|
| 28 | ∞ | 0.78000 | 1.51680 | 64.2 |
| 29 | ∞ | (BF) | | |
| Image surface | ∞ | | | |

TABLE 5

(Aspherical data)

Surface No. 9

K = 0.00000E+00, A4 = 1.43019E−04, A6 = 2.74470E−06, A8 = −7.80981E−08
A10 = 5.36677E−10
Surface No. 10

K = 0.00000E+00, A4 = 1.29417E−04, A6 = 7.19533E−07, A8 = −5.80983E−08
A10 = 4.77012E−10
Surface No. 16

K = 0.00000E+00, A4 = −1.56386E−04, A6 = −7.88420E−07, A8 = 1.88743E−09
A10 = −2.53388E−10
Surface No. 26

K = 0.00000E+00, A4 = −4.14955E−04, A6 = 1.61134E−05, A8 = −2.07107E−07
A10 = 4.36533E−09
Surface No. 27

K = 0.00000E+00, A4 = −1.54889E−04, A6 = 1.99095E−05, A8 = −1.02510E−07
A10 = −6.16053E−10

TABLE 6

(Various data in infinity in-focus condition)

Zooming ratio 55.97618

| | Wide-angle limit | Middle position | Telephoto limit |
|---|---|---|---|
| Focal length | 3.7099 | 27.7639 | 207.6670 |
| F-number | 2.90017 | 5.35598 | 6.09833 |
| Half view angle | 47.5874 | 7.8566 | 1.0678 |
| Image height | 3.4080 | 3.9020 | 3.9020 |
| Overall length of lens system | 87.8697 | 115.1827 | 149.9656 |
| BF | 0.87250 | 0.87502 | 0.83536 |
| d6 | 0.5000 | 38.0000 | 65.6266 |
| d12 | 38.0000 | 9.5098 | 1.5000 |
| d21 | 1.7974 | 14.6317 | 23.2941 |
| d23 | 2.0026 | 8.0931 | 2.9963 |
| d25 | 2.0000 | 5.0000 | 16.9543 |
| d27 | 4.9383 | 1.3142 | 1.0000 |

Zoom lens unit data

| Lens unit | Initial surface No. | Focal length |
|---|---|---|
| 1 | 1 | 87.83129 |
| 2 | 7 | −8.76270 |
| 3 | 13 | 18.42267 |
| 4 | 22 | 40.00001 |
| 5 | 24 | −17.02984 |
| 6 | 26 | 14.44295 |

Numerical Example 3

The zoom lens system of Numerical Example 3 corresponds to Embodiment 3 shown in FIG. 7. Table 7 shows the surface data of the zoom lens system of Numerical Example 3. Table 8 shows aspherical data. Table 9 shows the various data in infinity in-focus condition.

TABLE 7

(surface data)

| Surface number | r | d | nd | vd |
|---|---|---|---|---|
| Object surface | ∞ | | | |
| 1 | 101.04660 | 1.70000 | 1.80610 | 33.3 |
| 2 | 50.29840 | 0.01000 | 1.56732 | 42.8 |
| 3 | 50.29840 | 4.59890 | 1.49700 | 81.6 |

TABLE 7-continued (surface data)

| Surface number | r | d | nd | vd |
|---|---|---|---|---|
| 4 | −915.77430 | 0.20000 | | |
| 5 | 47.57360 | 3.35840 | 1.59282 | 68.6 |
| 6 | 151.30440 | Variable | | |
| 7 | 90.02690 | 1.00000 | 1.80420 | 46.5 |
| 8 | 8.41060 | 5.96030 | | |
| 9* | −13.67970 | 0.70000 | 1.77200 | 50.0 |
| 10* | 39.29940 | 0.20000 | | |
| 11 | 27.46550 | 2.02830 | 1.94595 | 18.0 |
| 12 | −61.88720 | Variable | | |
| 13(Diaphragm) | ∞ | 0.50000 | | |
| 14* | 11.71920 | 2.96540 | 1.60602 | 57.4 |
| 15* | −36.45880 | 2.18400 | | |
| 16 | 26.19990 | 1.79380 | 1.49700 | 81.6 |
| 17 | −28.29220 | 0.01000 | 1.56732 | 42.8 |
| 18 | −28.29220 | 0.50000 | 1.80610 | 33.3 |
| 19 | 10.25980 | 1.75320 | | |
| 20 | 16.76280 | 3.10060 | 1.49700 | 81.6 |
| 21 | −13.39240 | Variable | | |
| 22* | 25.37060 | 0.50000 | 1.49700 | 81.6 |
| 23 | 15.82780 | Variable | | |
| 24 | −13.09360 | 0.50000 | 1.49700 | 81.6 |
| 25 | −63.24920 | Variable | | |
| 26* | 26.84170 | 2.28190 | 1.54410 | 56.1 |
| 27* | −12.23030 | Variable | | |
| 28 | ∞ | 0.78000 | 1.51680 | 64.2 |
| 29 | ∞ | (BF) | | |
| Image surface | ∞ | | | |

TABLE 8

(Aspherical data)

Surface No. 9

K = 0.00000E+00, A4 = 1.00449E−04, A6 = 4.14158E−06, A8 = −1.13090E−07
A10 = 7.71897E−10

Surface No. 10

K = 0.00000E+00, A4 = 8.34840E−05, A6 = 1.96741E−06, A8 = −8.66211E−08
A10 = 7.18477E−10

Surface No. 14

K = −1.68898E+00, A4 = 1.02874E−04, A6 = 1.69686E−07, A8 = 2.74156E−08
A10 = −6.65038E−10

Surface No. 15

K = 0.00000E+00, A4 = 1.24422E−04, A6 = −1.58596E−07, A8 = 2.32560E−08
A10 = −6.94722E−10

Surface No. 22

K = 0.00000E+00, A4 = 1.51005E−05, A6 = 6.06276E−07, A8 = −1.09490E−09
A10 = −1.37441E−10

Surface No. 26

K = 0.00000E+00, A4 = −5.46739E−04, A6 = 4.53405E−05, A8 = −2.04305E−06
A10 = 4.00236E−08

Surface No. 27

K = 0.00000E+00, A4 = −3.92063E−04, A6 = 5.70284E−05, A8 = −2.48640E−06
A10 = 4.66694E−08

TABLE 9

(Various data in infinity in-focus condition)

Zooming ratio 56.01093

| | Wide-angle limit | Middle position | Telephoto limit |
|---|---|---|---|
| Focal length | 3.7100 | 27.7631 | 207.7995 |
| F-number | 2.90055 | 5.14453 | 6.09905 |
| Half view angle | 47.5795 | 7.8568 | 1.0722 |
| Image height | 3.4080 | 3.9020 | 3.9020 |
| Overall length of lens system | 89.2051 | 112.3873 | 149.9538 |
| BF | 0.86922 | 0.89449 | 0.81929 |
| d6 | 0.7000 | 38.0000 | 68.0438 |
| d12 | 37.9693 | 8.0576 | 1.5000 |
| d21 | 1.3000 | 19.4149 | 9.4993 |
| d23 | 3.8687 | 5.0000 | 16.4666 |
| d25 | 2.0000 | 2.3000 | 16.0000 |
| d27 | 5.8731 | 2.0955 | 1.0000 |

Zoom lens unit data

| Lens unit | Initial surface No. | Focal length |
|---|---|---|
| 1 | 1 | 91.23618 |
| 2 | 7 | −8.36202 |
| 3 | 13 | 16.55291 |
| 4 | 22 | −86.16731 |
| 5 | 24 | −33.33346 |
| 6 | 26 | 15.76644 |

Numerical Example 4

The zoom lens system of Numerical Example 4 corresponds to Embodiment 4 shown in FIG. 10. Table 10 shows the surface data of the zoom lens system of Numerical Example 4. Table 11 shows aspherical data. Table 12 shows the various data in infinity in-focus condition.

TABLE 10

(surface data)

| Surface number | r | d | nd | vd |
|---|---|---|---|---|
| Object surface | ∞ | | | |
| 1 | 183.98470 | 1.70000 | 1.80610 | 33.3 |
| 2 | 67.92430 | 4.38180 | 1.49700 | 81.6 |
| 3 | −1488.09180 | 0.20000 | | |
| 4 | 63.96440 | 3.10620 | 1.49700 | 81.6 |
| 5 | 338.34500 | 0.20000 | | |
| 6 | 62.14300 | 2.06570 | 1.59282 | 68.6 |
| 7 | 118.16060 | Variable | | |
| 8* | 110.17070 | 1.00000 | 1.80420 | 46.5 |
| 9* | 8.55240 | 6.52500 | | |
| 10 | −15.97770 | 0.50000 | 1.83400 | 37.3 |
| 11 | 24.12240 | 1.94830 | 1.94595 | 18.0 |
| 12 | −130.52540 | 0.20000 | | |
| 13 | 36.32690 | 1.26720 | 1.94595 | 18.0 |
| 14 | 130.15990 | Variable | | |
| 15(Diaphragm) | ∞ | 0.86600 | | |
| 16* | 10.81890 | 2.98260 | 1.60602 | 57.4 |
| 17* | −64.56790 | 1.40380 | | |
| 18 | 25.98340 | 2.04880 | 1.49700 | 81.6 |
| 19 | −41.80150 | 0.50000 | 1.80610 | 33.3 |
| 20 | 10.09100 | 0.75960 | | |
| 21 | 16.22860 | 2.64960 | 1.49700 | 81.6 |
| 22 | −15.97040 | Variable | | |
| 23 | −96.55230 | 1.00000 | 1.49700 | 81.6 |
| 24 | 18.42480 | Variable | | |
| 25* | 15.59150 | 2.36330 | 1.54410 | 56.1 |
| 26* | −28.65170 | Variable | | |
| 27 | ∞ | 1.00000 | 1.51680 | 64.2 |
| 28 | ∞ | (BF) | | |
| Image surface | ∞ | | | |

TABLE 11

(Aspherical data)

Surface No. 8

K = 0.00000E+00, A4 = 3.71891E−05, A6 = −1.52620E−07, A8 = −6.22383E−10
A10 = 3.42906E−12
Surface No. 9

K = 0.00000E+00, A4 = 1.28467E−05, A6 = −6.55779E−07, A8 = 3.18057E−08
A10 = −5.54881E−10
Surface No. 16

K = −1.46742E+00, A4 = 1.06548E−04, A6 = −3.95334E−07, A8 = 2.32214E−08
A10 = −3.07692E−10
Surface No. 17

K = 0.00000E+00, A4 = 9.61720E−05, A6 = −7.66559E−07, A8 = 2.05604E−08
A10 = −3.21656E−10
Surface No. 25

K = 0.00000E+00, A4 = −9.31931E−05, A6 = 5.33764E−06, A8 = −9.18960E−08
A10 = 2.42305E−09
Surface No. 26

K = 0.00000E+00, A4 = −2.13550E−05, A6 = 2.42195E−06, A8 = 1.65201E−07
A10 = −3.08081E−09

TABLE 12

(Various data in infinity in-focus condition)

Zooming ratio 65.29142

| | Wide-angle limit | Middle position | Telephoto limit |
|---|---|---|---|
| Focal length | 3.7003 | 29.9025 | 241.5946 |
| F-number | 3.40044 | 6.18470 | 6.72954 |
| Half view angle | 47.8740 | 7.2988 | 0.9130 |
| Image height | 3.4080 | 3.9020 | 3.9020 |
| Overall length of lens system | 91.8364 | 121.4421 | 161.9891 |
| BF | 1.18296 | 1.18464 | 1.11143 |
| d7 | 0.7000 | 43.4264 | 68.2003 |
| d14 | 38.0000 | 9.6915 | 1.5000 |
| d22 | 1.8000 | 20.9317 | 15.1409 |
| d24 | 4.0000 | 5.0000 | 36.3686 |
| d26 | 7.4855 | 2.5400 | 1.0000 |

Zoom lens unit data

| Lens unit | Initial surface No. | Focal length |
|---|---|---|
| 1 | 1 | 90.80748 |
| 2 | 8 | −8.75022 |
| 3 | 15 | 16.89083 |
| 4 | 23 | −31.04187 |
| 5 | 25 | 18.91322 |

Numerical Example 5

The zoom lens system of Numerical Example 5 corresponds to Embodiment 5 shown in FIG. 13. Table 13 shows the surface data of the zoom lens system of Numerical Example 5. Table 14 shows aspherical data. Table 15 shows various data in infinity in-focus condition.

TABLE 13

(surface data)

| Surface number | r | d | nd | vd |
|---|---|---|---|---|
| Object surface | ∞ | | | |
| 1 | 101.74870 | 1.70000 | 1.80610 | 33.3 |
| 2 | 50.33300 | 4.74560 | 1.49700 | 81.6 |
| 3 | −605.39680 | 0.20000 | | |
| 4 | 46.61920 | 3.45190 | 1.59282 | 68.6 |
| 5 | 150.18640 | Variable | | |
| 6 | 67.97700 | 1.00000 | 1.80420 | 46.5 |
| 7 | 8.22480 | 5.32150 | | |
| 8 | −17.48260 | 0.70000 | 1.80420 | 46.5 |
| 9 | 44.76360 | 0.20000 | | |
| 10 | 23.22590 | 1.87950 | 1.94595 | 18.0 |
| 11 | −191.03070 | Variable | | |
| 12(Diaphragm) | ∞ | 0.50000 | | |
| 13* | 10.44370 | 2.88840 | 1.60602 | 57.4 |
| 14* | −29.91320 | 1.37480 | | |
| 15 | −487.23250 | 1.41220 | 1.49700 | 81.6 |
| 16 | −30.82980 | 0.50000 | 1.80610 | 33.3 |
| 17 | 11.02100 | 0.79690 | | |
| 18 | 17.94940 | 2.61400 | 1.49700 | 81.6 |
| 19 | −11.58640 | Variable | | |
| 20 | −75.02180 | 1.00000 | 1.49700 | 81.6 |
| 21 | 15.80850 | Variable | | |
| 22* | 20.02920 | 2.03640 | 1.54410 | 56.1 |
| 23* | −27.45430 | Variable | | |
| 24 | ∞ | 1.00000 | 1.51680 | 64.2 |
| 25 | ∞ | (BF) | | |
| Image surface | ∞ | | | |

TABLE 14

(Aspherical data)

Surface No. 13

K = −1.60976E+00, A4 = 1.04725E−04, A6 = 2.12223E−07, A8 = 1.45232E−08
A10 = −1.24938E−09

Surface No. 14

K = 0.00000E+00, A4 = 1.42668E−04, A6 = −5.82692E−08, A8 = −9.34423E−09
A10 = −1.01070E−09

Surface No. 22

K = 0.00000E+00, A4 = −1.44465E−04, A6 = −7.23537E−06, A8 = 1.18316E−06
A10 = −2.43212E−08

Surface No. 23

K = 0.00000E+00, A4 = −1.02402E−04, A6 = −1.34449E−05, A8 = 1.85128E−06
A10 = −3.97456E−08

TABLE 15

(Various data in infinity in-focus condition)

Zooming ratio 46.49462

|  | Wide-angle limit | Middle position | Telephoto limit |
|---|---|---|---|
| Focal length | 4.4500 | 30.3448 | 206.9017 |
| F-number | 2.90073 | 4.76104 | 6.09964 |
| Half view angle | 41.9908 | 7.1947 | 1.0634 |
| Image height | 3.4080 | 3.9020 | 3.9020 |
| Overall length of lens system | 87.7865 | 108.5451 | 144.6492 |
| BF | 1.17818 | 1.21026 | 1.12781 |
| d5 | 0.7000 | 38.0000 | 65.1258 |
| d11 | 38.0000 | 9.1383 | 1.5000 |
| d19 | 4.0137 | 19.7354 | 11.5740 |
| d21 | 4.0000 | 5.0000 | 29.4323 |
| d23 | 6.5734 | 2.1399 | 2.5681 |

Zoom lens unit data

| Lens unit | Initial surface No. | Focal length |
|---|---|---|
| 1 | 1 | 87.60252 |
| 2 | 6 | −9.26364 |
| 3 | 12 | 15.94498 |
| 4 | 20 | −26.17634 |
| 5 | 22 | 21.61055 |

The following Table 16 shows the corresponding values to the individual conditions in the zoom lens systems of each of Numerical Examples.

TABLE 16

(Values corresponding to conditions)

| | | Numerical Example | | | | |
|---|---|---|---|---|---|---|
| Condition | | 1 | 2 | 3 | 4 | 5 |
| (1) | $f_{G1}/f_W$ | 22.56 | 23.67 | 24.59 | 24.54 | 19.69 |
| (2) | $m_{6T}/m_{6W}$ | 1.35 | 1.52 | 1.61 | — | — |
| (3) | $m_{5T}/m_{5W}$ | — | — | — | 1.77 | 1.33 |

The present disclosure is applicable to digital input devices such as a digital camera, a camera of a portable information terminal such as a smart phone, a camera of a personal digital assistance (PDA), a monitor camera of a monitor system, a Web camera, a vehicle-mounted camera, and the like. In particular, the present disclosure is applicable to a photographing optical system in which high image quality is required like in a digital camera.

As presented above, embodiments have been described as examples of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. A zoom lens system, in order from an object side to an image side, comprising:
  a first lens unit having positive optical power;
  a second lens unit having negative optical power;
  a third lens unit having positive optical power;
  a fourth lens unit having positive optical power;
  a fifth lens unit having negative optical power, and
  a sixth lens unit having positive optical power, wherein
  in zooming from a wide-angle limit to a telephoto limit at a time of image taking, the respective lens units move along an optical axis so that an interval between the first lens unit and the second lens unit at the telephoto limit becomes larger than that at the wide-angle limit, an interval between the second lens unit and the third lens unit at the telephoto limit becomes narrower than that at the wide-angle limit, and an interval between the third lens unit and the fourth lens unit at the telephoto lens limit becomes larger than that at the wide-angle limit,
  an aperture diaphragm is disposed between the second lens unit and the third lens unit, and
  the following condition (1) is satisfied:

$$18.5 < f_{G1}/f_w < 30.0 \qquad (1)$$

where
  $f_{G1}$ is a focal length of the first lens unit, and
  $f_W$ is a focal length of the zoom lens system at the wide-angle limit.

2. The zoom lens system as claimed in claim 1, wherein the fourth lens unit is a focusing lens unit that moves along the optical axis in focusing from an infinity in-focus condition to a close-object in-focus condition.

3. The zoom lens system as claimed in claim 1, wherein the following condition (2) is satisfied:

$$1.1 < m_{6T}/m_{6W} < 2.0 \quad (2)$$

where $m_{6T}$ is a lateral magnification of the sixth lens unit at the telephoto limit, and $m_{6W}$ is a lateral magnification of the sixth lens unit at the wide-angle limit.

4. An imaging device capable of outputting an optical image of an object as an electric image signal, comprising:
   a zoom lens system that forms an optical image of the object; and
   an image sensor that converts the optical image formed by the zoom lens system into the electric image signal, wherein
   the zoom lens system is a zoom lens system as claimed in claim 1.

5. A camera for converting an optical image of an object into an electric image signal and then performing at least one of displaying and storing of the converted image signal, comprising:
   an imaging device including a zoom lens system that forms the optical image of the object, and an image sensor that converts the optical image formed by the zoom lens system into the electric image signal, wherein
   the zoom lens system is a zoom lens system as claimed in claim 1.

6. A zoom lens system, in order from an object side to an image side, comprising:
   a first lens unit having positive optical power;
   a second lens unit having negative optical power;
   a third lens unit having positive optical power;
   a fourth lens unit having negative optical power;
   a fifth lens unit having negative optical power, and
   a sixth lens unit having positive optical power, wherein
   in zooming from a wide-angle limit to a telephoto limit at a time of image taking, the respective lens units move along an optical axis so that an interval between the first lens unit and the second lens unit at the telephoto limit becomes larger than that at the wide-angle limit, an interval between the second lens unit and the third lens unit at the telephoto limit becomes narrower than that at the wide-angle limit, and an interval between the third lens unit and the fourth lens unit at the telephoto lens limit becomes larger than that at the wide-angle limit,
   an aperture diaphragm is disposed between the second lens unit and the third lens unit, and
   the following condition (1) is satisfied:

$$18.5 < f_{G1}/f_W < 30.0 \quad (1)$$

where $f_{G1}$ is a focal length of the first lens unit, and $f_W$ is a focal length of the zoom lens system at the wide-angle limit.

7. The zoom lens system as claimed in claim 6, wherein the fourth lens unit is a focusing lens unit that moves along the optical axis in focusing from an infinity in-focus condition to a close-object in-focus condition.

8. The zoom lens system as claimed in claim 6, wherein the following condition (2) is satisfied:

$$1.1 < m_{6T}/m_{6W} < 2.0 \quad (2)$$

where $m_{6T}$ is a lateral magnification of the sixth lens unit at the telephoto limit, and $m_{6W}$ is a lateral magnification of the sixth lens unit at the wide-angle limit.

* * * * *